United States Patent
Thadani et al.

(10) Patent No.: US 12,430,395 B2
(45) Date of Patent: Sep. 30, 2025

(54) GENERATION AND PRESENTATION OF SUMMARY LIST BASED UPON ARTICLE

(71) Applicant: Verizon Media Inc., New York, NY (US)

(72) Inventors: Kapil Raj Thadani, New York, NY (US); Philip Anthony Hairr, San Jose, CA (US); Lippe Oosterhof, Los Angeles, CA (US); Xi Gao, San Francisco, CA (US)

(73) Assignee: Yahoo Ad Tech LLC, New York, NY (US)

( * ) Notice: Subject to any disclaimer, the term of this patent is extended or adjusted under 35 U.S.C. 154(b) by 156 days.

(21) Appl. No.: 17/350,080

(22) Filed: Jun. 17, 2021

(65) Prior Publication Data

US 2022/0405343 A1 Dec. 22, 2022

(51) Int. Cl.
*G06F 16/957* (2019.01)
*G06F 16/34* (2025.01)
*G06F 40/216* (2020.01)
*G06F 40/295* (2020.01)

(52) U.S. Cl.
CPC ........ *G06F 16/9577* (2019.01); *G06F 16/345* (2019.01); *G06F 40/216* (2020.01); *G06F 40/295* (2020.01)

(58) Field of Classification Search
CPC .. G06F 40/216; G06F 40/295; G06F 16/9577; G06F 16/345
See application file for complete search history.

(56) References Cited

U.S. PATENT DOCUMENTS

| | | | |
|---|---|---|---|
| 10,042,924 B2 * | 8/2018 | Billawal | G06F 40/211 |
| 11,061,950 B2 * | 7/2021 | Daultani | G06F 40/216 |
| 2002/0078090 A1 * | 6/2002 | Hwang | G06F 16/345 |
| | | | 715/201 |
| 2002/0103836 A1 * | 8/2002 | Fein | G06F 16/345 |
| 2015/0339288 A1 * | 11/2015 | Baker | G06F 40/295 |
| | | | 704/9 |

(Continued)

FOREIGN PATENT DOCUMENTS

| | | | | |
|---|---|---|---|---|
| GB | 2399427 A | * | 9/2004 | G06F 17/30719 |
| WO | WO-2015179643 A1 | * | 11/2015 | G06F 17/2211 |
| WO | WO-2020082154 A1 | * | 4/2020 | G06F 16/14 |

OTHER PUBLICATIONS

Method and Apparatus For Automatically Summarizing The Contents of an Electronic Document, published on Oct. 27, 2014, Document ID: JP2014528620 A, pp. 12 (Year: 2014).*

(Continued)

*Primary Examiner* — Chau T Nguyen
(74) *Attorney, Agent, or Firm* — Cooper Legal Group LLC

(57) ABSTRACT

One or more computing devices, systems, and/or methods for generating summary lists based upon articles are presented. In an example, a summarizing set of sentences of an article may be identified. The summarizing set of sentences may be analyzed to identify one or more first sentences of the summarizing set of sentences that meet a set of conditions and/or identify one or more second sentences of the summarizing set of sentences that do not meet the set of conditions. A summary list summarizing the article may be generated based upon the one or more first sentences.

20 Claims, 11 Drawing Sheets

(56) References Cited

U.S. PATENT DOCUMENTS

| | | | | |
|---|---|---|---|---|
| 2015/0370768 | A1* | 12/2015 | Tigchelaar | G06F 16/345 |
| | | | | 715/254 |
| 2016/0117489 | A1* | 4/2016 | Furuichi | G06F 16/955 |
| | | | | 726/1 |
| 2016/0335234 | A1* | 11/2016 | Baker | G06F 40/295 |
| 2017/0161372 | A1* | 6/2017 | Fernández | G06F 40/295 |
| 2017/0277668 | A1* | 9/2017 | Luo | G06F 16/345 |
| 2022/0382728 | A1* | 12/2022 | Religa | G06N 20/20 |

OTHER PUBLICATIONS

Lee Dong Kwon and Kim Bo Ram, "Server And Method For Article Summary Service", published on Jan 12, 2016, Document ID: KR101583073 B1, pp. 16 (Year: 2016).*

Akanksha et al., "Procedure and system for the generation of extractive text summaries using non-supervised deep apprenticeship and autocoders", published on Jun. 13, 2019, Document ID: ES 2716634A1, pp. 17 (Year: 2019).*

* cited by examiner

GENERATION AND PRESENTATION OF SUMMARY LIST BASED UPON ARTICLE

BACKGROUND

Many services, such as websites, applications, etc. may provide platforms for consuming articles, such as news articles, educational articles, etc. For example, a user may interact with a service. A list of articles may be presented to the user while interacting with the service. The user may be interested in understanding and/or determining a significance of the article. However, it may be difficult and/or it may take a substantial amount of time for the user to consume the article.

SUMMARY

In accordance with the present disclosure, one or more computing devices and/or methods are provided. In an example, an article may be analyzed to identify a plurality of phrases, wherein each phrase of the plurality of phrases comprises at least a portion of a sentence of the article. A plurality of phrase relevance scores associated with the plurality of phrases may be determined. A set of sentences of the article may be selected based upon the plurality of phrase relevance scores associated with the plurality of phrases. The sentences may be analyzed to identify one or more first sentences of the set of sentences that meet a set of conditions and/or identify one or more second sentences of the set of sentences that do not meet the set of conditions. A summary list summarizing the article may be generated based upon the one or more first sentences.

In an example, a summarizing set of sentences of an article may be identified. The summarizing set of sentences may be analyzed to identify one or more first sentences of the summarizing set of sentences that meet a set of conditions and/or identify one or more second sentences of the summarizing set of sentences that do not meet the set of conditions. A summary list summarizing the article may be generated based upon the one or more first sentences.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
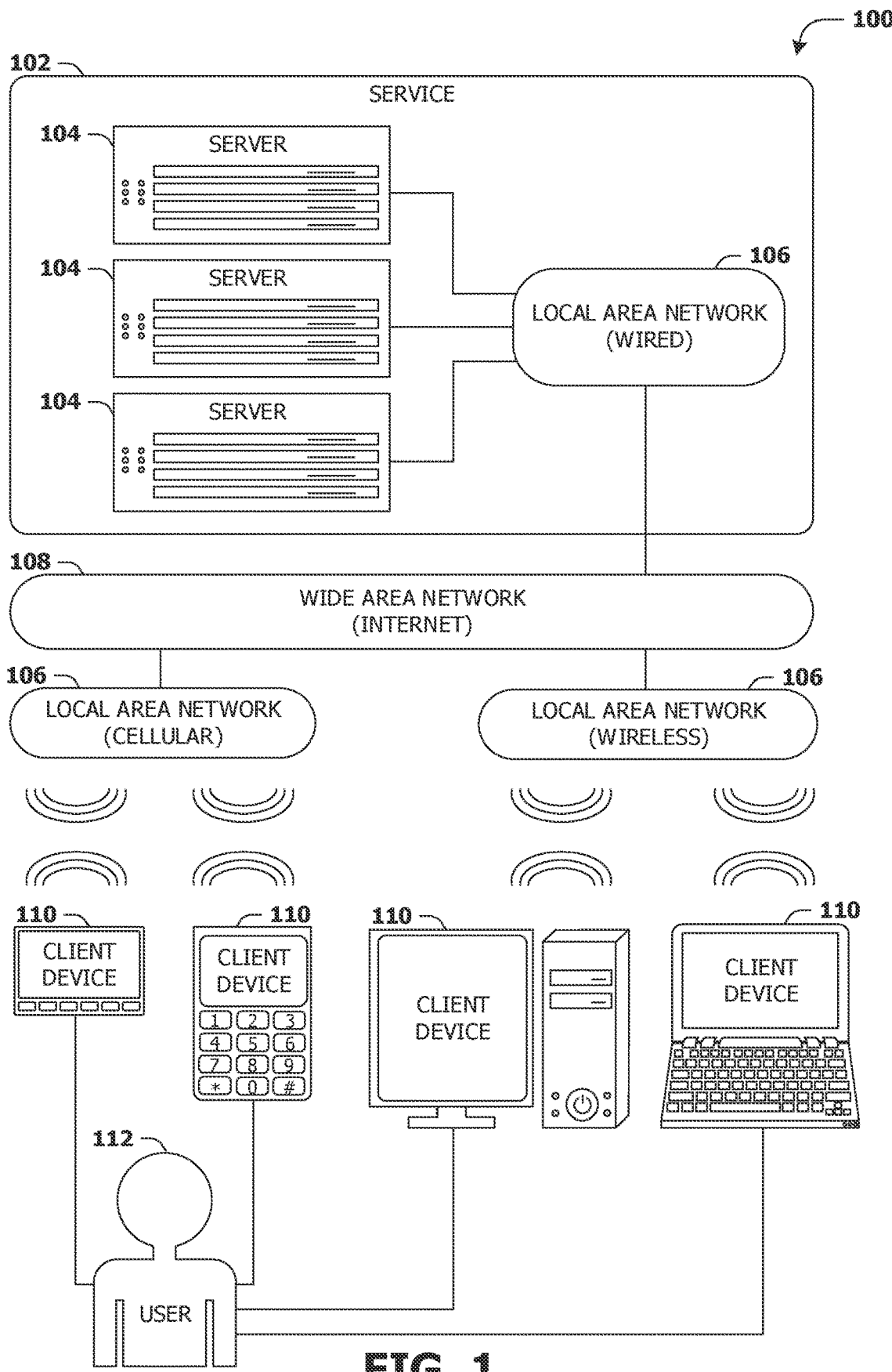
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
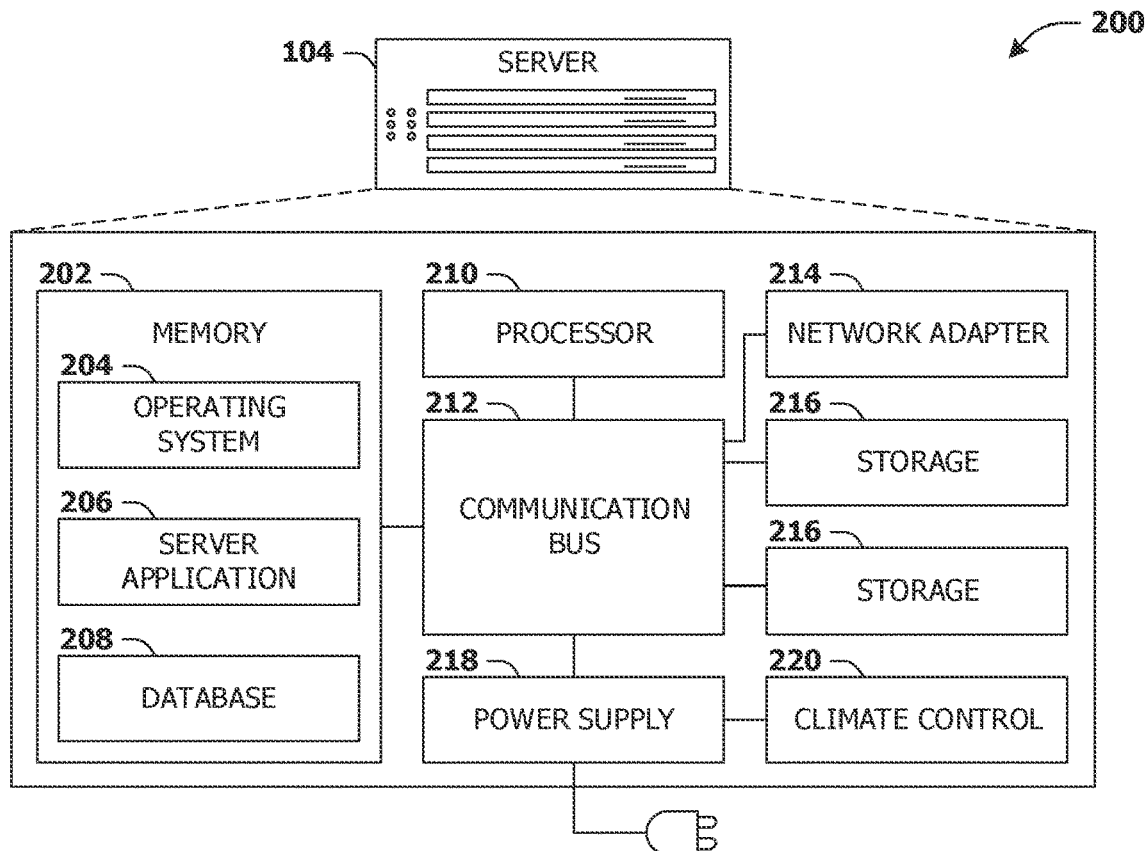
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
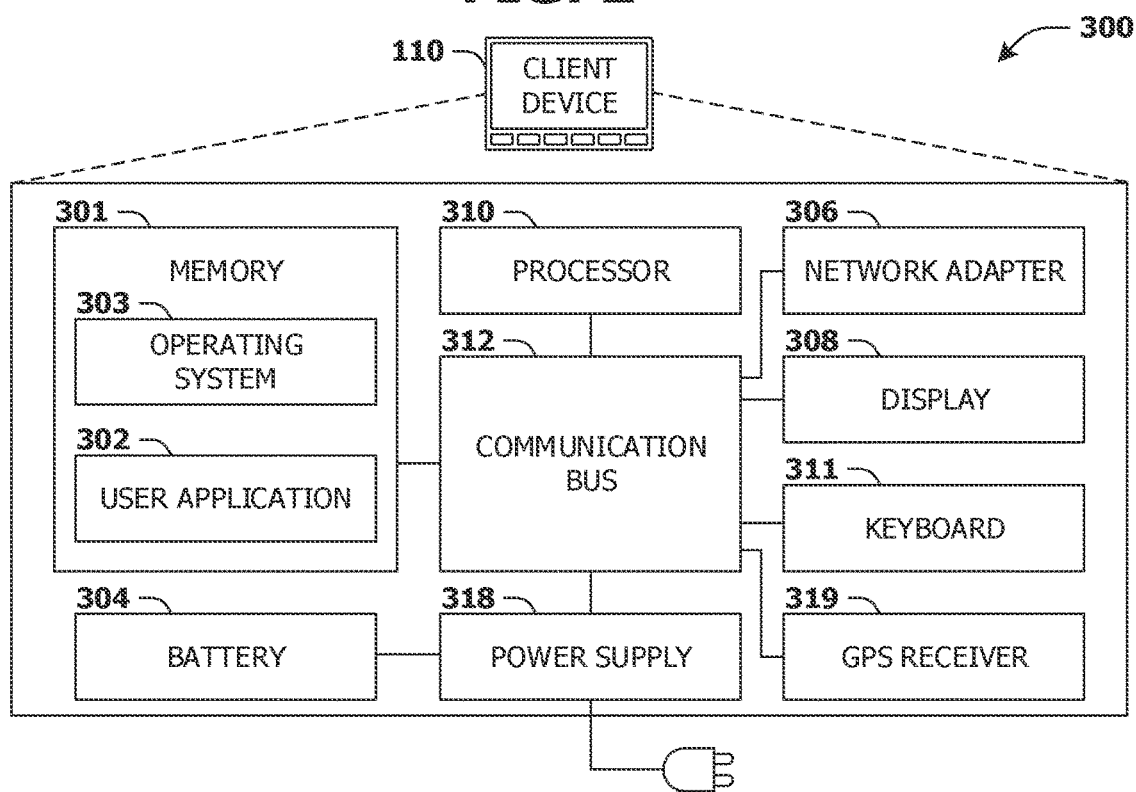
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices, systems, and/or techniques for generating summary lists based upon articles are presented. For example, a user (and/or a device associated with the user) may access and/or interact with a service, such as a website, an application, etc. that provides a platform for viewing articles (of the website, the application, etc.). For example, the user may be interested in consuming an article (e.g., a news article, an educational article, etc.). However, the user may (merely) be interested in understanding and/or determining a significance of main points of the article. It may be difficult and/or it may take a substantial amount of time for the user to consume the article to find the main points of the article. Accordingly, the user may be unable to find the main points of the article and/or the user may spend a considerable amount of time finding and/or consuming the main points of the article.

Thus, in accordance with one or more of the techniques presented herein, an article may be analyzed to identify a plurality of phrases in the article. A plurality of phrase relevance scores associated with the plurality of phrases may be determined. A summarizing set of sentences of the article may be selected based upon the plurality of phrase relevance scores associated with the plurality of phrases. Sentences of the summarizing set of sentences may be analyzed to determine whether they meet a set of conditions. A sentence that meets the set of conditions may be determined to be suitable for inclusion in a summary list summarizing the article. For example, a sentence may meet the set of conditions if the sentence is complete (e.g., the sentence does not have an open quote), understanding of the sentence does not rely upon other sentences of the article and/or the sentence is not too long or short for a list item of the summary list. Alternatively and/or additionally, a sentence that does not meet the set of conditions may be determined to be unsuitable for inclusion in the summary list. For example, a sentence may not meet the set of conditions if the sentence is incomplete (e.g., the sentence comprises merely a portion of a quote), understanding of the sentence relies upon other sentences of the article and/or the sentence is too long or short for a list item of the summary list. One or more first sentences of the set of sentences that meet the set of conditions may be identified. One or more second sentences of the set of sentences that do not meet the set of conditions may be identified. A summary list summarizing the article may be generated based upon the one or more first sentences. In some examples, one or more sentences that do not meet the set of conditions may be modified to generate one or more modified sentences that meet the set of conditions, and/or the summary list may be generated based upon the one or more modified sentences. A graphical user interface of a device may be controlled to display the summary list. A user of the device may be able to conveniently understand main points of the article using the summary list without having to consume the article. Further, generating the summary list using sentences that meet the set of conditions provides for improved readability and understandability of the summary list.

Figure 4:
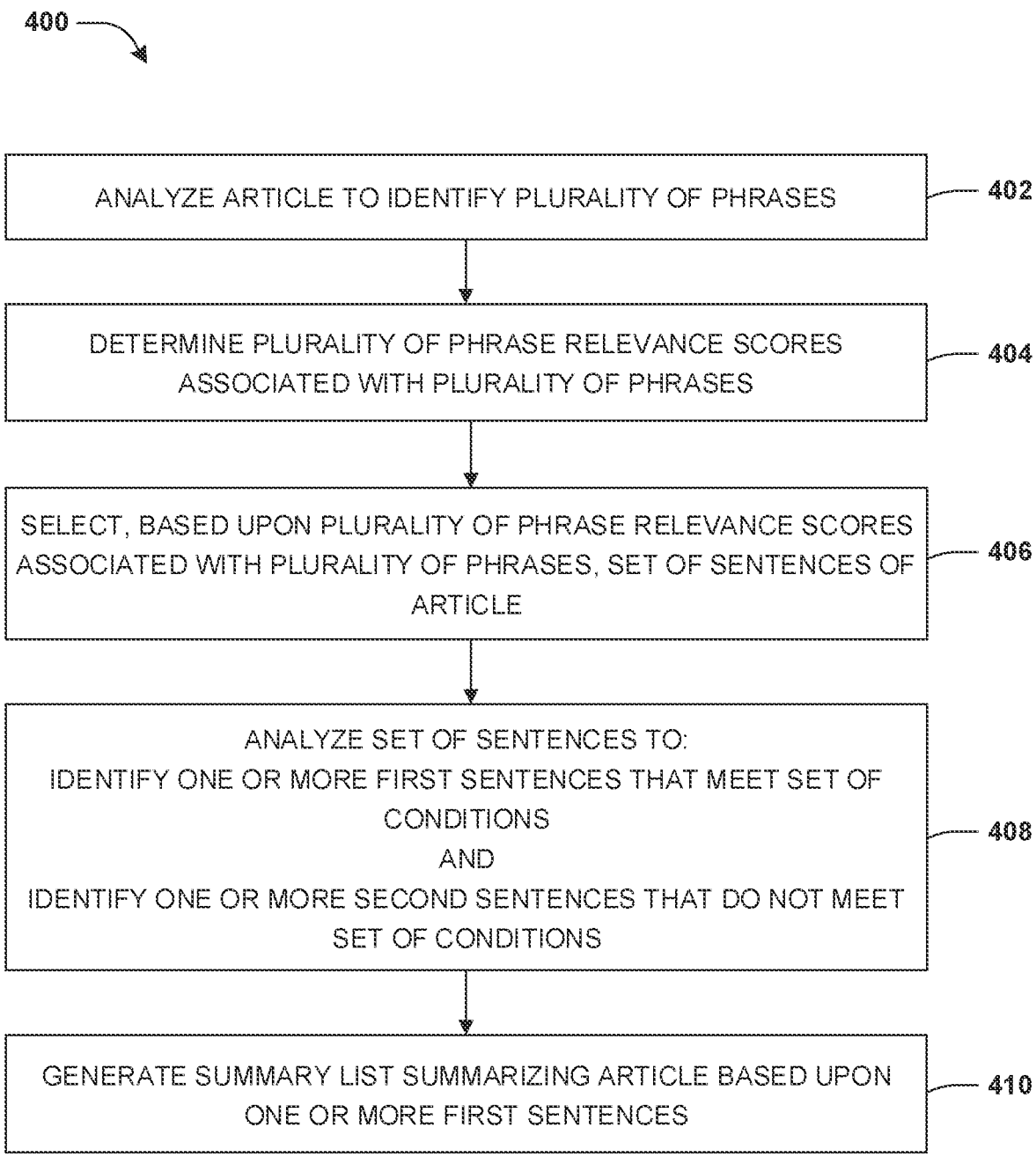
FIG. 4 is a flow chart illustrating an example method for generating summary lists based upon articles.

An embodiment of generating summary lists based upon articles is illustrated by an example method 400 of FIG. 4, and is further described in conjunction with system 501 of FIGS. 5A-5G. A content system for presenting content via client devices may be provided. For example, client devices may access and/or interact with one or more services, such as one or more web pages, one or more applications, one or more content interfaces, etc. for viewing and/or downloading content items from one or more servers associated with the content system. For example, the content items may comprise at least one of articles (e.g., news articles, educational articles, research papers, sports articles, informational articles, blogs, etc.), video content items, audio content items, etc.

Figure 5A:
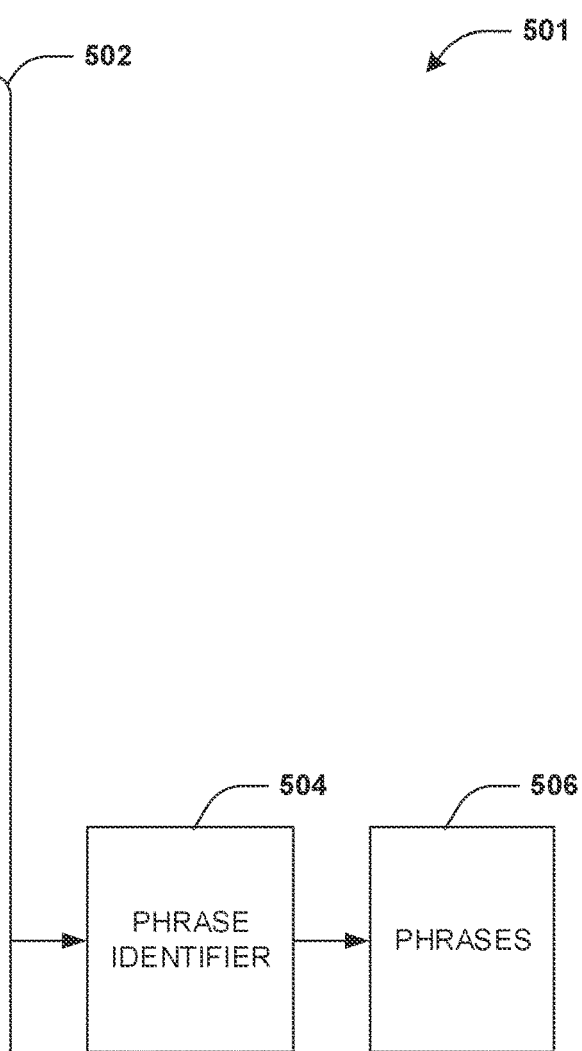
FIG. 5A is a component block diagram illustrating an example system for generating summary lists based upon articles, where a plurality of phrases of an article are identified.

An article 502, such as shown in FIG. 5A, may be identified. For example, the article 502 may comprise at least one of a news article, an educational article, a research paper, a sports article, an informational article, a blog, etc. In some examples, the article 502 may be identified within a content item database associated with the content system. Alternatively and/or additionally, the article 502 may be identified and/or selected for generation of a summary list associated with the article 502 responsive to the article 502 being included (e.g., stored) in the content item database (and/or responsive to the article 502 being uploaded to the content item database). Alternatively and/or additionally, the article 502 may be identified and/or selected for generation of the summary list responsive to the article 502 being published and/or accessible via one or more services (such as one or more web pages, one or more applications, one or more content interfaces, etc.) associated with the content system. Alternatively and/or additionally, the article 502 may be identified and/or selected for generation of the summary list based upon an amount of activity associated with the article 502. The amount of activity may correspond to a number of instances of the article 502 being accessed (such as being accessed by client devices via the content system). Alternatively and/or additionally, the amount of activity may correspond to a frequency of instances of the article 502 being accessed (e.g., a number of instances of the article 502 being accessed in an hour, a number of instances of the article 502 being accessed in a day, etc. via the content system). For example, the article 502 may be identified and/or selected for generation of the summary list responsive to a determination that the amount of activity exceeds a threshold amount of activity.

Alternatively and/or additionally, the article 502 may be identified and/or selected for generation of the summary list responsive to receiving a request to generate the summary list associated with the article 502. For example, the request to generate the summary list may comprise the article 502. Alternatively and/or additionally, the request to generate the summary list may comprise an indication of the article 502. For example, the article 502 may be retrieved using the indication of the article 502 (e.g., the indication may comprise a web address of the article 502 from which the article 502 can be retrieved).

In some examples, the article 502 may be analyzed to determine whether or not the article 502 is summarizable. For example, one or more operations for generating the summary list associated with the article 502 (such as analyzing the article 502 to identify a plurality of phrases and/or other operations described herein) may be performed based upon (and/or responsive to) a determination that the article 502 is summarizable. In some examples, whether or not the article 502 is summarizable may be determined based upon one or more characteristics of the article 502, such as a type of article of the article 502, a size of the article 502 and/or one or more other characteristics.

For example, the article 502 may be determined to be summarizable based upon a determination that the type of article of the article 502 is a summarizable type of article (e.g., a news article, a sports article, etc.). Alternatively and/or additionally, it may be determined that the article 502 is not summarizable based upon a determination that the article 502 corresponds to a non-summarizable type of article (e.g., a recipe page, a stock price page, a sports score page, etc.).

Alternatively and/or additionally, whether or not the article 502 is summarizable may be determined based upon summarizing eligibility information associated with the article 502. For example, the summarizing eligibility information may correspond to at least one of one or more copyrights associated with the article 502, one or more permissions and/or one or more policies that may allow and/or may not allow summarizing of the article 502 to generate the summary list, etc.

In some examples, the article 502 may be analyzed to determine a summarizability score associated with the article 502. For example, the summarizability score may be determined based upon the type of article of the article 502, the size of the article 502 and/or one or more other information comprising at least one of a proportion of characters of the article 502 that are letters, a proportion of characters of the article 502 that are digits, a proportion of characters of the article 502 that are spaces, a proportion of characters of the article 502 that are punctuation, tokens that are alphabetic, etc. One or more machine learning techniques (e.g., a machine learned gradient boosting decision tree (GBDT) classifier) may be used to perform summarizability classification and/or determine the summarizability score based upon the article 502 and/or the information. In some examples, the summarizability score may be compared with a threshold summarizability score to determine whether or not the article 502 is summarizable. For example, if the summarizability score exceeds the threshold summarizability score, the article 502 may be determined to be summarizable and/or one or more operations to generate the summary list may be performed. Alternatively and/or additionally, if the summarizability score is less than the threshold summarizability score, the article 502 may be determined to not be summarizable and/or one or more operations to generate the summary list may not be performed.

At 402, the article 502 may be analyzed to identify a plurality of phrases 506 (such as shown in FIG. 5A). Each phrase of the plurality of phrases 506 may comprise at least a portion of a sentence of the article 502. As shown in FIG. 5A, the article 502 may be input to a phrase identification module 504, for example. The phrase identification module 504 may analyze the article 502 to identify the plurality of phrases 506. In some examples, a phrase of the plurality of phrases 506 may comprise a group of one or more words, letters, symbols and/or numbers that form a statement and/or that are related to (e.g., about) one or more entities and/or one or more topics. In an example, the plurality of phrases

506 may comprise at least one of <Diggle has supporters>, <throughout the country>, <Diggle expressed sadness>, etc.

In some examples, at least some phrases of the plurality of phrases 506 may be identified using one or more phrase detection techniques. For example, the one or more phrase detection techniques may comprise one or more dictionary-based phrase detection techniques. For example, the article 502 may be analyzed based upon a phrase dictionary (e.g., a list of phrases) to identify one or more portions of the article 502 that match one or more phrases in the list of phrases. A portion (e.g., a group of one or more words, letters, symbols and/or numbers) of the article 502 that matches a phrase in the list of phrases may be determined to be a phrase and/or may be included in the plurality of phrases 506.

In some examples, a portion of the article 502 may match a phrase in the list of phrases if the portion is the same as the phrase in the list of phrases. For example, a portion of the article 502 may be determined to be a phrase and/or may be included in the plurality of phrases 506 responsive to a determination that the portion is the same as a phrase in the list of phrases. Alternatively and/or additionally, a portion of the article 502 may match a phrase in the list of phrases if an arrangement and/or structure of parts of speech (e.g., nouns, pronouns, adjectives, determiners, verbs, adverbs, prepositions, conjunctions and/or interjections) of the portion is the same as an arrangement and/or structure of parts of speech of the phrase. For example, a portion of the article 502 may be determined to be a phrase and/or may be included in the plurality of phrases 506 responsive to a determination that an arrangement and/or structure of parts of speech of the portion is the same as an arrangement and/or structure of parts of speech of a phrase in the list of phrases.

Alternatively and/or additionally, a portion of the article 502 may match a phrase in the list of phrases if a difference between the portion and the phrase is less than a threshold difference (and/or a similarity between the portion and the phrase exceeds a threshold similarity). For example, a portion of the article 502 may be determined to be a phrase and/or may be included in the plurality of phrases 506 responsive to a determination that a difference between the portion and the phrase is less than the threshold difference (and/or a similarity between the portion and the phrase exceeds the threshold similarity). Alternatively and/or additionally, a portion of the article 502 may match a phrase in the list of phrases if a difference between an arrangement and/or structure of parts of speech of the portion and an arrangement and/or structure of parts of speech of the phrase is less than a threshold difference. For example, a portion of the article 502 may be determined to be a phrase and/or may be included in the plurality of phrases 506 responsive to a determination that a difference between an arrangement and/or structure of parts of speech of the portion and an arrangement and/or structure of parts of speech of a phrase in the list of phrases is less than a threshold difference.

In some examples, the one or more other phrase detection techniques may comprise one or more named entity recognition (NER) techniques. In some examples, the article 502 may be analyzed using the one or more NER techniques to identify a portion of the article 502, comprising a sequence of one or more words, letters, symbols and/or numbers, corresponding to a phrase. The phrase (and/or other phrases identified using the one or more NER techniques) may be included in the plurality of phrases 506. In some examples, the one or more phrase detection techniques may comprise one or more other techniques (e.g., one or more natural language processing techniques and/or one or more coreference resolution techniques) other than the one or more dictionary-based phrase detection techniques and/or the one or more NER techniques.

Figure 5B:
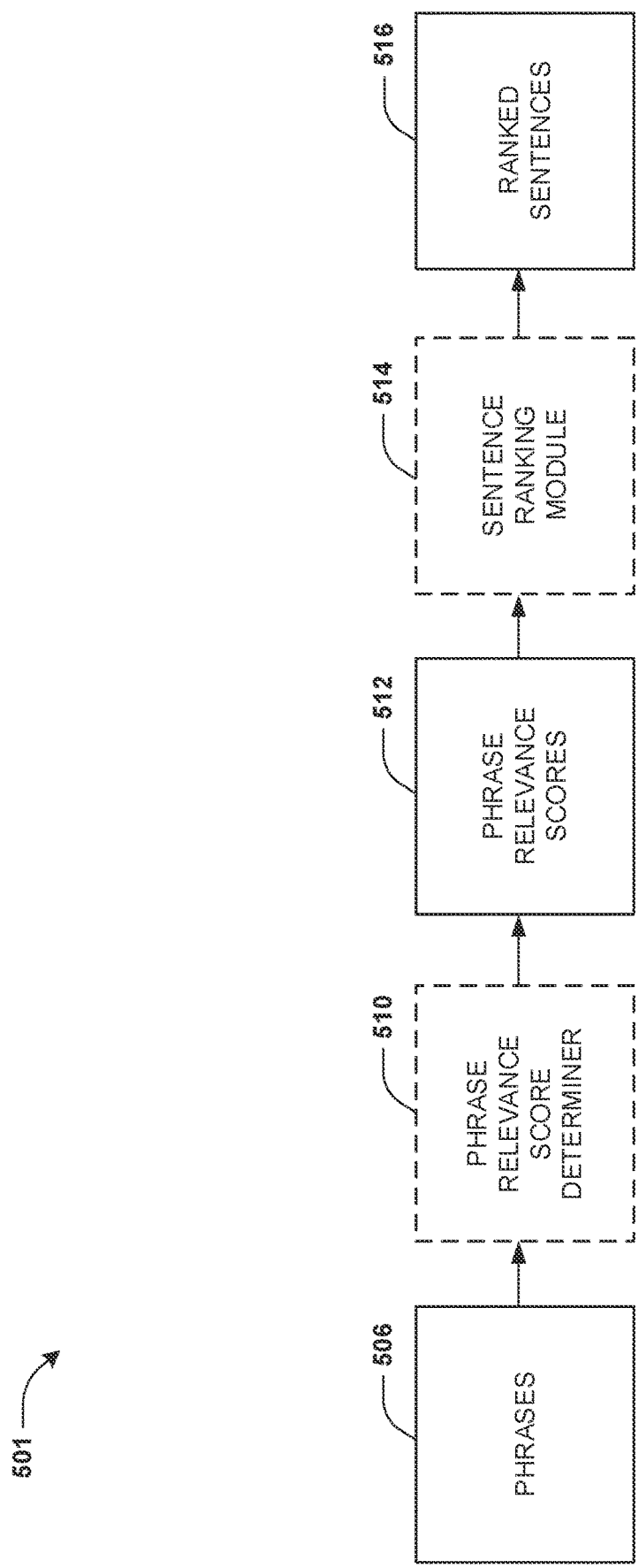
FIG. 5B is a component block diagram illustrating an example system for generating summary lists based upon articles, where sentences of an article are ranked based upon phrase relevance scores associated with phrases of the article.

At 404, a plurality of phrase relevance scores 512 associated with the plurality of phrases 506 may be determined (such as shown in FIG. 5B). As shown in FIG. 5B, the plurality of phrases 506 and/or the article 502 may be input to a phrase relevance score determiner 510, for example. The phrase relevance score determiner 510 may analyze the plurality of phrases 506 and/or the article 502 to determine the plurality of phrase relevance scores 512. A phrase relevance score of the plurality of phrase relevance scores 512 may be associated with a phrase of the plurality of phrases 506.

In some examples, a phrase relevance score associated with a phrase of the plurality of phrases 506 may be determined based upon one or more features of the phrase. The one or more features may comprise one or more topics and/or one or more entities associated with the phrase.

In an example, the one or more entities associated with the phrase may comprise one or more subjects (expressed and/or discussed, for example) in the phrase and/or the article 502. The one or more entities may be determined by analyzing the phrase (and/or the article 502) using one or more NER techniques and/or by comparing the phrase (and/or the article 502) with one or more resources (e.g., an encyclopedia, an online encyclopedia, a news channel, a news website, a website, a book, a research article, a research article database and/or a different type of information database, etc.) to identify the one or more entities. In some examples, the one or more entities may comprise at least one of one or more places (e.g., countries, cities, geographic locations, etc.), one or more people (e.g., people of a particular location, people with a particular occupation, politicians, celebrities, socialites, etc.), one or more things (e.g., devices, natural objects, etc.), one or more organizations, one or more ideas, one or more systems, one or more events, one or more historical events, one or more current events, one or more abstract objects, one or more physical objects, etc. In an example in which the phrase comprises <John Diggle lost the election>, the one or more entities may comprise John Diggle and/or the election.

In some examples, the one or more entities associated with the phrase may be determined using one or more coreference resolution techniques, such as by using a trained coreference resolution model to determine at least one entity of the phrase. In an example in which the phrase includes a term that refers to an entity, the one or more coreference resolution techniques may be used to identify the entity to which the term refers. In an example, the phrase may comprise <Diggle>, and/or the one or more coreference resolution techniques may be used to determine that the term <Diggle> refers to John Diggle. In another example, the phrase may comprise <He>, and/or the one or more coreference resolution techniques may be used to determine that the term <He> refers to John Diggle. Thus, based upon the determination that the term of the phrase refers to John Diggle, John Diggle (rather than Diggle, or He) may be determined to be an entity of the one or more entities (e.g., the phrase relevance score associated with the phrase is determined based upon the one or more entities).

In an example, the one or more topics associated with the phrase may correspond to one or more topics that the phrase relates to. The one or more topics may be determined by analyzing the phrase (and/or the article 502) using one or more topic identification techniques (e.g., one or more multi-label learning (MLL) techniques and/or one or more other techniques, such as one or more natural language processing techniques and/or one or more coreference resolution techniques) and/or by comparing the phrase (and/or the article 502) with one or more resources (e.g., an encyclopedia, an online encyclopedia, a news channel, a news website, a website, a book, a research article, a research article database and/or a different type of information database, etc.) to identify the one or more topics. In an example, the one or more topics may comprise at least one of the economy, politics, business news, the United States, international news, the White House, entertainment, celebrity news, science news, technology, health news, travel destinations, cuisine, transportation, cost-friendliness, tourism, Asia tourism, etc. In an example in which the phrase comprises <promoting his tax plan>, the one or more topics may comprise the economy and/or politics.

In some examples, the phrase relevance score associated with the phrase may correspond to a level of contextual relevance of the phrase to the article 502 (e.g., contextual relevance of the one or more features, comprising the one or more entities and/or the one or more topics, to the article 502). The phrase relevance score may be determined by analyzing the article 502 based upon the one or more features (e.g., the one or more entities and/or the one or more topics) associated with the phrase. In some examples, the phrase relevance score associated with the phrase may be determined using one or more machine learning techniques. For example, the phrase relevance score and/or other phrase relevance scores of the plurality of phrase relevance scores 512 may be generated using a machine learning model based upon at least one of the article 502, the one or more entities associated with the phrase, the one or more topics associated with the phrase, other topics associated with other phrases of the plurality of phrases 506, other entities associated with other topics of the plurality of entities, etc.

In an example, the phrase relevance score associated with the phrase may be determined based upon one or more frequencies of the one or more entities (associated with the phrase) in the article 502 (e.g., a frequency of an entity may be based upon a number of instances that the entity is discussed and/or stated in the article 502 and/or based upon a number of phrases of the article 502 that are determined to be associated with the entity). Alternatively and/or additionally, the phrase relevance score may be determined based upon a relevance of an entity of the one or more entities to the article 502 (e.g., the relevance of the entity may correspond to a closeness of subject matter of the entity to at least one of one or more portions of the article 502, the article 502 as a whole, topics of the article 502, other entities discussed and/or stated in the article 502, etc.).

Alternatively and/or additionally, the phrase relevance score associated with the phrase may be determined based upon one or more frequencies of the one or more topics (associated with the phrase) in the article 502 (e.g., a frequency of a topic may be based upon a number of instances that the topic is discussed in the article 502 and/or based upon a number of phrases of the article 502 that are determined to be associated with the topic). Alternatively and/or additionally, the phrase relevance score may be determined based upon a relevance of a topic of the one or more topics to the article 502 (e.g., the relevance of the topic may correspond to a closeness of subject matter of the topic to at least one of one or more portions of the article 502, the article 502 as a whole, topics of the article 502, other topics discussed in the article 502, etc.).

At 406, a summarizing set of sentences of the article may be selected based upon the plurality of phrase relevance scores associated with the plurality of phrases. For example, sentence relevance rankings of a plurality of sentences of the article may be determined based upon the plurality of phrase relevance scores. In some examples, the plurality of sentences may be identified by analyzing the article 502 to identify periods and/or other punctuation indicating a beginning of a sentence and/or an end of a sentence. The summarizing set of sentences may be selected from the plurality of sentences based upon the sentence relevance rankings. A sentence relevance ranking may correspond to a ranking of a sentence of the plurality of sentences with respect to other sentences of the plurality of sentences.

For example, as shown in FIG. 5B, the plurality of phrase relevance scores 512 and/or the plurality of sentences of the article may be input to a sentence ranking module 514. The sentence ranking module 514 may analyze the plurality of phrase relevance scores 512, the plurality of phrases 506 and/or the plurality of sentences to rank the plurality of sentences and/or output ranked sentences 516 (e.g., the plurality of sentences in order of ranking).

In some examples, the plurality of phrases 506 may be ranked by phrase relevance score, such as from highest phrase relevance score to lowest phrase relevance score. The plurality of sentences may be ranked based upon rankings of the plurality of phrases 506. For example, a sentence comprising a highest ranked phrase of the plurality of phrases 506 may be the highest ranked sentence, a sentence comprising a second-highest ranked phrase of the plurality of phrases 506 may be the second-highest ranked sentence, etc.

Alternatively and/or additionally, the plurality of phrase relevance scores 512, the plurality of phrases 506 and/or the plurality of sentences may be analyzed to determine a plurality of sentence relevance scores. For example, a sentence relevance score of the plurality of sentence relevance scores may be associated with a sentence of the plurality of sentences. The sentence relevance score associated with the sentence may be determined based upon one or more phrase relevance scores associated with one or more phrases in the sentence. For example, one or more operations (e.g., mathematical operations) may be performed using the one or more phrase relevance scores to determine the sentence relevance score. The plurality of sentences may be ranked by sentence relevance score, such as from highest sentence relevance score to lowest sentence relevance score. For example, a sentence associated with a highest sentence relevance score may be the highest ranked sentence, a sentence associated with a second-highest sentence relevance score may be the second-highest ranked sentence, etc.

Figure 5C:
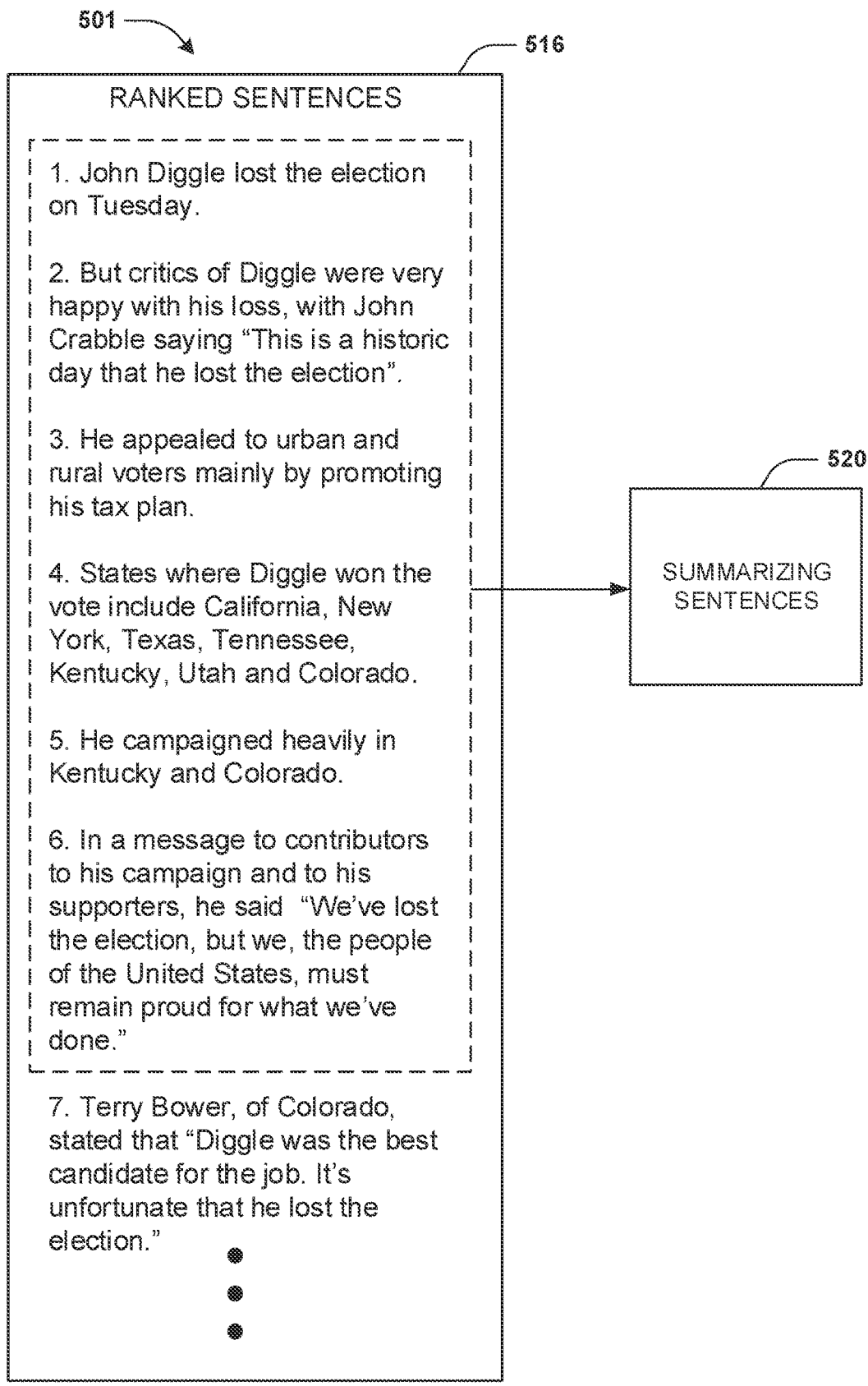
FIG. 5C is a component block diagram illustrating an example system for generating summary lists based upon articles, where a summarizing set of sentences is selected based upon a plurality of sentence relevance rankings associated with a plurality of sentences.

In some examples, the summarizing set of sentences may be selected based upon the sentence relevance rankings of the plurality of sentences, such as shown in FIG. 5C. In some examples, N highest ranked sentences may be selected from the ranked sentences 516 for inclusion in the summarizing set of sentences (shown with reference number 520 in FIG. 5C). In an example shown in FIG. 5C, N may be equal to 6 (e.g., sentences associated with sentence relevance rankings 1 through 6 may be selected for inclusion in the summarizing set of sentences 520 and/or sentences associated with sentence relevance rankings other than 1 through 6 are not selected for inclusion in the summarizing set of sentences 520). In some examples, N may be less than or equal to a threshold number of sentences. For example, a number of sentences of the summarizing set of sentences 520 may be at most the threshold number of sentences.

In some examples, the threshold number of sentences may be determined based upon one or more characteristics of the article 502. For example, the threshold number of sentences may be determined based upon a size of the article 502 (e.g., at least one of a number of words, a number of characters, etc. of the article 502). For example, one or more operations (e.g., mathematical operations) may be performed using the size of the article 502 to determine the threshold number of sentences. Alternatively and/or additionally, the threshold number of sentences may be determined based upon a set of threshold determination information. For example, the set of threshold determination information may be stored on a database, a server and/or a computer, and/or may be accessed to determine the threshold number of sentences. The set of threshold determination information may be indicative of a plurality of article-size ranges and a plurality of thresholds associated with the plurality of article-size ranges. The threshold number of sentences may be determined based upon a determination that the size of the article 502 is within an article-size range of the plurality of article-size ranges and that the set of threshold determination information indicates that the article-size range is associated with the threshold number of sentences.

Alternatively and/or additionally, the threshold number of sentences may be determined based upon one or more topics of the article 502. For example, different types of articles may be associated with different thresholds (e.g., the threshold number of sentences may be different if the article 502 a sports-related article than if the article 502 is a politics-related article). In some examples, the set of threshold determination information may be indicative of a plurality of topics and a plurality of thresholds associated with the plurality of topics. The threshold number of sentences may be determined based upon one or more thresholds, of the plurality of thresholds indicated by the set of threshold determination information, that are associated with the one or more topics of the article 502. For example, one or more operations (e.g., mathematical operations) may be performed using the one or more thresholds to determine the threshold number of sentences. In an example where the one or more thresholds comprise a single threshold associated with a single topic of the article 502, the threshold number of sentences may be equal to the single threshold.

Alternatively and/or additionally, the threshold number of sentences may be a threshold used for summarizing articles of different sizes and/or different types.

Alternatively and/or additionally, the threshold number of sentences may be determined based upon one or more settings associated with generating the summary list associated with the article 502. For example, the one or more settings may be received from a client device. In an example, the one or more settings may be indicative of the threshold number of sentences to be applied for selecting the summarizing set of sentences 520. The request to generate the summary list may be indicative of the one or more settings.

In some examples, one or more portions of the article 502 may not be included in the summarizing set of sentences 520 and/or the summary list. For example, the one or more portions of the article 502 that may not be included in (and/or may be excluded from) the summarizing set of sentences 520 and/or the summary list may comprise at least one of an image caption (which may be identified based upon a positioning of the image caption with respect to an image, for example), social media content, a dateline (e.g., an indication of a time and/or place that the article 502 was published and/or updated), a disclaimer of the article 502 (which may be identified based upon one or more terms of the disclaimer and/or based upon a formatting of the disclaimer, such the disclaimer being in italics), a portion of the article 502 having one or more characteristics (e.g., an all italics paragraph at the beginning of or preceding an article body of the article 502), etc.

Figure 5D:
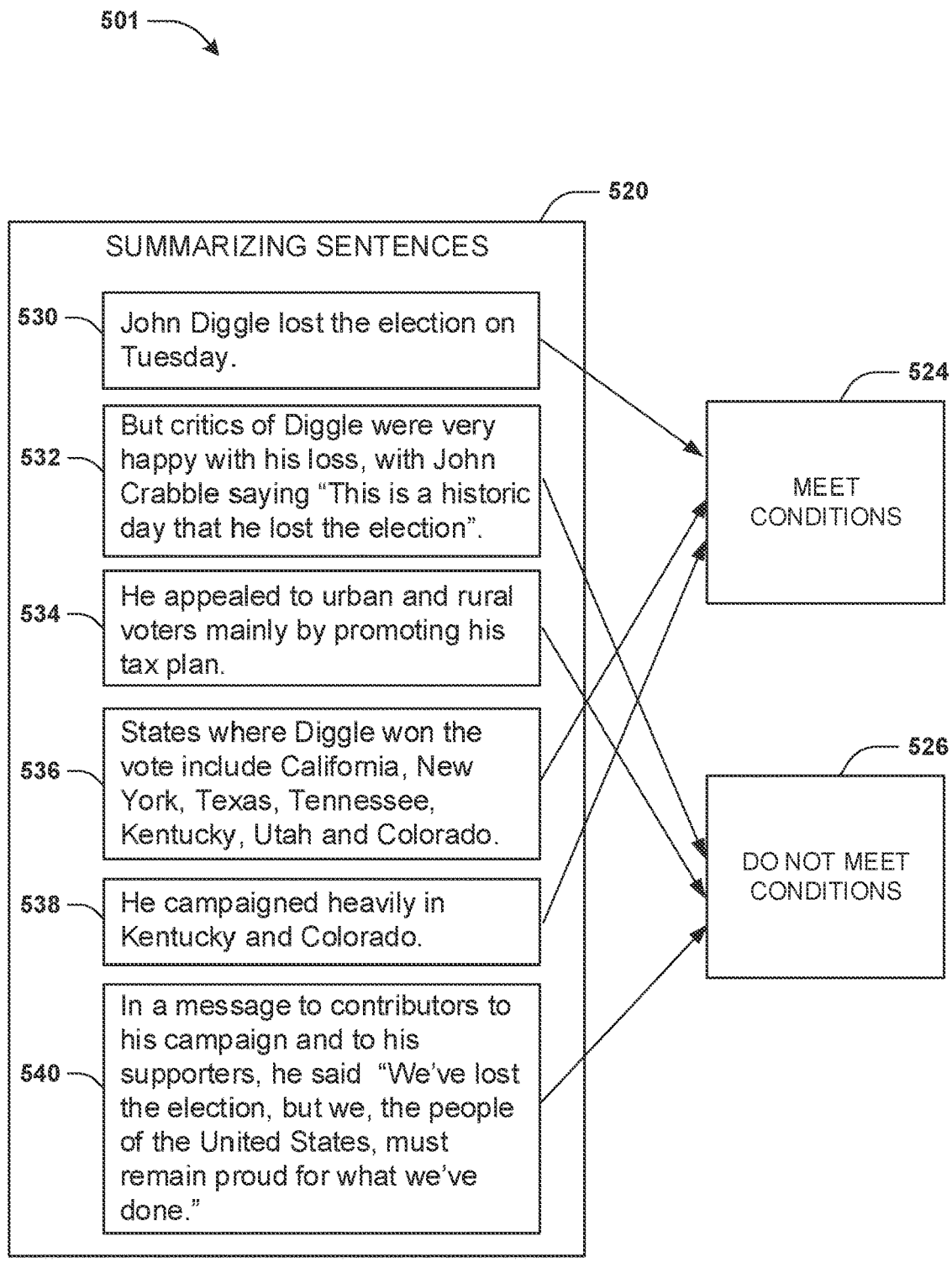
FIG. 5D is a component block diagram illustrating an example system for generating summary lists based upon articles, where a first set of sentences that meet a set of conditions and a second set of sentences that do not meet the set of conditions are identified.

At 408, the summarizing set of sentences 520 may be analyzed based upon a set of conditions. A first set of sentences 524 (e.g., a set of one or more sentences), of the summarizing set of sentences 520, that meet the set of conditions may be identified, such as shown in FIG. 5D. A second set of sentences 526 (e.g., a set of one or more sentences), of the summarizing set of sentences 520, that do not meet the set of conditions may be identified. In some examples, the set of conditions comprises conditions that should be met in order for a sentence (as it exists in the article 502, for example) to be included in the summary list associated with the article 502. For example, in response to determining that a sentence of the summarizing set of sentences 520 does not meet the set of conditions, the sentence may be discarded (e.g., not included in the summary list) or modified for inclusion in the summary list, in accordance with one or more of the techniques herein.

In the example shown in FIG. 5D, the first set of sentences 524 determined to meet the set of conditions comprise sentence 530, sentence 536 and/or sentence 538. In the example shown in FIG. 5D, the second set of sentences 526 determined to not meet the set of conditions comprise sentence 532, sentence 534 and/or sentence 540.

The summarizing set of sentences 520 are shown in FIG. 5D in order of how they occur (e.g., appear) in the article 502. In some examples, analyzing the summarizing set of sentences 520 and determining whether or not sentences of the summarizing set of sentences 520 meet the set of conditions may be performed in the order in which the sentences occur in the article 502. For example, based upon the sentence 530 occurring before the sentence 532 in the article 502, the sentence 530 may be analyzed to determine whether or not the sentence 530 meets the set of conditions (and/or the sentence 530 may be selected for inclusion in the first set of sentences 524 based upon a determination that the sentence 530 meets the set of conditions) prior to analyzing the sentence 532 to determine whether or not the sentence 532 meets the set of conditions.

In some examples, the set of conditions may comprise a first condition that is met by a first sentence if 1) the first sentence does not begin with a pronoun (e.g., at least one of he, she, they, him, her, them, his, hers, their, theirs, its, this, that, these, those, such, another, etc.); and/or 2) the first sentence begins with a pronoun and a second sentence which precedes the first sentence in the article 502 (and/or directly precedes the first sentence in the article 502) is selected for inclusion in the first set of sentences 524 and/or the summary list. The first sentence begins with a pronoun if an initial term of the first sentence is a pronoun. The first condition may be met if the first sentence does not begin with a pronoun. The first condition may be met if the first sentence begins with a pronoun, and the second sentence preceding (and/or directly preceding) the first sentence in the article 502 is selected for inclusion in the first set of sentences 524 and/or the summary list. The first condition may not be met if the first sentence begins with a pronoun, and the second sentence preceding (and/or directly preceding) the first sentence in the article 502 is not included in the first set of sentences 524 and/or the summary list.

In some examples, one or more quotes of a sentence (e.g., one or more portions of the sentence that are within quotation marks of the sentence) may not be considered when determining whether or not the sentence meets the first condition.

In some examples, it may be determined that the sentence 534 (e.g., <He appealed to urban and rural voters mainly by promoting his tax plan.>) does not meet the first condition. For example, the determination that the sentence 534 does not meet the first condition may be based upon a determination that the sentence 534 begins with a pronoun (e.g., <He>) and that a sentence (e.g., <Diggle started his campaign back in November of 2018.>) which precedes (e.g., directly precedes) the sentence 534 in the article 502 is not included in the first set of sentences 524 and/or the summary list. Responsive to the determination that the sentence 534 does not meet the first condition, the sentence 534 may be selected for inclusion in the second set of sentences 526.

In some examples, it may be determined that the sentence 538 (e.g., <He campaigned heavily in Kentucky and Colorado.>) does meet the first condition. For example, although the sentence 538 begins with a pronoun (e.g., <He>), the sentence 536 preceding (and/or directly preceding) the sentence 538 in the article 502 is included in the first set of sentences 524 and/or the summary list. For example, due to the sentence 536 occurring before the sentence 538 in the article 502, the sentence 536 may be analyzed and/or included in the first set of sentences 524 prior to analyzing the sentence 538 to determine whether the sentence 538 meets the set of conditions. Accordingly, the sentence 538 may be analyzed based upon the set of conditions after the sentence 536 is already selected for inclusion in the first set of sentences 524 (and/or inclusion in the summary list).

In some examples, a pronoun in a sentence may be identified using one or more dictionary-based pronoun detection techniques and/or one or more other techniques (e.g., one or more natural language processing techniques). For example, a sentence may be analyzed based upon a pronoun dictionary (e.g., a list of pronouns) to determine whether or not the sentence comprises a pronoun and/or to identify one or more pronouns in the sentence.

In some examples, the set of conditions may comprise a second condition that is met by a first sentence if 1) the first sentence does not comprise a pronoun; 2) the first sentence comprises a pronoun and a proper noun; and/or 3) the first sentence comprises a pronoun, the first sentence does not comprise a proper noun, and a second sentence which precedes the first sentence in the article 502 (and/or directly precedes the first sentence in the article 502) is selected for inclusion in the first set of sentences 524 and/or the summary list. In some examples, a proper noun in a sentence may be identified using one or more NER techniques and/or one or more other techniques (e.g., one or more natural language processing techniques and/or one or more coreference resolution techniques). The second condition may be met if the first sentence does not comprise a pronoun. The second condition may be met if the first sentence comprises a pronoun and a proper noun (e.g., a proper noun defining the pronoun). The second condition may be met if the first sentence comprises a pronoun, the first sentence does not comprise a proper noun, and a second sentence preceding (and/or directly preceding) the first sentence in the article 502 is selected for inclusion in the first set of sentences 524 and/or the summary list. The second condition may not be met if the first sentence comprises a pronoun, the first sentence does not comprise a proper noun, and a second sentence preceding (and/or directly preceding) the first sentence in the article 502 is not selected for inclusion in the first set of sentences 524 and/or the summary list.

In some examples, one or more quotes of a sentence (e.g., one or more portions of the sentence that are within quotation marks of the sentence) may not be considered when determining whether or not the sentence meets the second condition.

In some examples, it may be determined that the sentence 540 (e.g., <In a message to contributors to his campaign and to his supporters, he said "We've lost the election, but we, the people of the United States, must remain proud for what we've done.">) does not meet the second condition. For example, the determination that the sentence 540 does not meet the second condition may be based upon a determination that the sentence 540 comprises a pronoun (e.g., <he> and/or <his>), that the sentence 540 does not comprise a proper noun (e.g., the sentence 540 does not comprises an indication of an entity to which the pronoun refers), and that a sentence (e.g., <Diggle started his campaign back in November of 2018.>) which precedes (e.g., directly precedes) the sentence 540 in the article 502 is not included in the first set of sentences 524 and/or the summary list. In an example, a pronoun <we've> and/or a proper noun <the United States> may not be considered when determining whether or not the sentence 540 meets the second condition based upon the pronoun <we've> and the proper noun <the United States> being within quotation marks in the sentence 540. Responsive to the determination that the sentence 540 does not meet the second condition, the sentence 540 may be selected for inclusion in the second set of sentences 526.

In some examples, the set of conditions may comprise a third condition that is met by a first sentence if 1) the first sentence does not begin with a term of one or more first types of terms (e.g., at least one of discourse markers, transitional terms, conjunctions, etc.); and/or 2) the first sentence begins with a term of the one or more first types of terms, and a second sentence which precedes the first sentence in the article 502 (and/or directly precedes the first sentence in the article 502) is selected for inclusion in the first set of sentences 524 and/or the summary list. The third condition may be met if the first sentence does not begin with a term of the one or more first types of terms. The third condition may be met if the first sentence begins with a term of the one or more first types of terms and a second sentence preceding (and/or directly preceding) the first sentence in the article 502 is selected for inclusion in the first set of sentences 524 and/or the summary list. The third condition may not be met if the first sentence begins with a term of the one or more first types of terms and a second sentence preceding (and/or directly preceding) the first sentence in the article 502 is selected for inclusion in the first set of sentences 524 and/or the summary list.

In some examples, one or more quotes of a sentence (e.g., one or more portions of the sentence that are within quotation marks of the sentence) may not be considered when determining whether or not the sentence meets the third condition.

The one or more first types of terms may correspond to terms that depend upon and/or relate to a different sentence (e.g., terms that indicate a relationship of a sentence to a preceding sentence). For example, if a sentence begins with a term of the one or more first types of terms, understanding of at least some of the sentence (e.g., understanding of a relationship, indicated by the term, between the sentence and a different sentence) relies upon the different sentence (e.g., a preceding sentence). The one or more first types of terms may correspond to at least one of discourse markers, transitional terms, conjunctions, etc. Examples of terms of the one or more first types of terms include terms that indicate an agreement with, an addition to and/or a similarity to preceding material (e.g., <And>, <Similarly>, <Furthermore>, <Additionally>, etc.), terms that indicate a contradiction, limitation and/or opposition to preceding material (e.g., <But>, <However>, <In contrast>, etc.), terms that indicate support for and/or an example of preceding material (e.g., <In other words>, <For this reason>, <Notably>, <Including>, <In fact>, etc.), terms that indicate an effect, a result and/or a consequence of preceding material (e.g., <As a result>, <Thus>, <Accordingly>, <Therefore>, etc.), terms that indicate conclusion and/or summarization of preceding material (e.g., <In summary>, <In conclusion>, etc.), and/or other terms.

In some examples, it may be determined that the sentence 532 (e.g., <But critics of Diggle were very happy with his loss, with John Crabble saying "This is a historic day that he lost the election">) does not meet the third condition. For example, the determination that the sentence 532 does not meet the third condition may be based upon a determination that the sentence 532 begins with a term (e.g., <But>) of the one or more first types of terms and that a sentence (e.g., <For some, it was a very upsetting loss>) which precedes (e.g., directly precedes) the sentence 532 in the article 502 is not included in the first set of sentences 524 and/or the summary list. Responsive to the determination that the sentence 532 does not meet the third condition, the sentence 532 may be selected for inclusion in the second set of sentences 526.

In some examples, a term of the one or more first types of terms in a sentence may be identified using one or more dictionary-based term detection techniques and/or one or more other techniques (e.g., one or more natural language processing techniques). For example, a sentence may be analyzed based upon a term dictionary (e.g., a list of terms of the one or more first types of terms) to determine whether or not the sentence comprises a term of the one or more first types of terms and/or to identify one or more terms of the one or more first types of terms in the sentence.

In some examples, the set of conditions may comprise a fourth condition that is met by a first sentence if 1) understanding of the first sentence does not rely upon a sentence other than the first sentence; and/or 2) understanding of the first sentence relies upon a second sentence in the article 502, and the second sentence is selected for inclusion in the first set of sentences 524 and/or the summary list. The fourth condition may be met if understanding of the first sentence does not rely upon a sentence other than the first sentence. The fourth condition may be met if understanding of the first sentence relies upon the second sentence in the article 502, and the second sentence is selected for inclusion in the first set of sentences 524 and/or the summary list. The fourth condition may not be met if understanding of the first sentence relies upon the second sentence in the article 502, and the second sentence is not included in the first set of sentences 524 and/or the summary list.

In an example, understanding of the first sentence may rely upon a sentence other than the first sentence if the first sentence comprises a term that relates to and/or depends upon one or more other sentences (e.g., a temporal term (such as firstly, finally, etc.) and/or a term of the one or more first types of term) and/or an undefined term (e.g., a pronoun, an undefined noun, etc. that is not defined in the first sentence). Alternatively and/or additionally, understanding of the first sentence may rely upon a sentence other than the first sentence if a subject of the first sentence is a pronoun and/or other type of undefined term. For example, the first sentence may comprise <The prime minister went to France> and a term <The prime minister> in the first sentence may not be defined. Understanding of the term <The prime minister> may rely upon a second sentence (such as a sentence comprising <The prime minister of Canada wanted to break an agreement with European countries>). That is, without the second sentence, a reader may not understand what <The prime minister> refers to, and may merely understand that the first sentence refers to <The prime minister of Canada> by reading the second sentence. In some examples, terms that rely upon a sentence other than the first sentence may be identified by analyzing the first sentence and/or the article 502 using one or more NER techniques and/or one or more other techniques (e.g., one or more natural language processing techniques and/or one or more coreference resolution techniques). For example, an undefined term (e.g., <The prime minister>) in the first sentence and/or a portion of the second sentence that defines the term (e.g., <The prime minister of Canada>) may be identified using the one or more NER techniques and/or the one or more other techniques.

In some examples, one or more quotes of a sentence (e.g., one or more portions of the sentence that are within quotation marks of the sentence) may not be considered when determining whether or not the sentence meets the fourth condition.

In some examples, the set of conditions may comprise a fifth condition that is met by a first sentence if 1) the first sentence does not comprise a referring term that refers to an entity and that does not define the entity; 2) the first sentence comprises a referring term that refers to a first entity and that does not define the first entity, and the first sentence defines the first entity; and/or 3) the first sentence comprises a referring term that refers to a first entity and that does not define the first entity, and a second sentence that precedes the first sentence in the article 502 and that defines the first entity, is included in the first set of sentences 524 and/or the summary list, wherein among sentences, preceding the first sentence in the article 502, that are included in the first set of sentences 524 and/or the summary list, the second sentence is closest to the first sentence in the article 502. The fifth condition may be met if the first sentence does not comprise a referring term that refers to an entity and that does not define the entity.

In some examples, a referring term, that refers to an entity and that does not define the entity, may comprise a pronoun. Alternatively and/or additionally, a referring term, that refers to an entity and that does not define the entity, may comprise a term other than a pronoun, such as an undefined term (e.g., <the prime minister>, <the worker>, etc.). That is, based upon the undefined term alone, a reader may not understand what the undefined term refers to (e.g., a reader may not be able to determine and/or appreciate the first entity, to which the undefined term refers, based upon the undefined term alone).

The fifth condition may be met if the first sentence comprises a referring term referring to a first entity without defining the first entity, and the first sentence defines the first entity. In an example, the first sentence may comprise <Before he gave his speech, the prime minister of Italy spoke with French diplomats>. In the example, the first sentence comprises a referring term (e.g., a pronoun <he>) referring to a first entity (e.g., the referring entity refers to <the prime minister of Italy>), wherein the referring term does not define the first entity and the first sentence defines the first entity. For example, it may be determined that the first sentence defines the first entity by analyzing the first sentence to identify a defining term (e.g., <the prime minister of Italy>) defining the first entity. The defining term may comprise a proper noun corresponding to the first entity, a name of the first entity, a surname of the first entity, a title of the first entity (such as prime minister), etc. In some examples, it may be determined that the referring term and the defining term refer to the first entity using one or more coreference resolution techniques.

The fifth condition may be met if the first sentence comprises a referring term referring to a first entity without defining the first entity, and a second sentence that precedes the first sentence in the article 502 and that defines the first entity, is included in the first set of sentences 524 and/or the summary list, wherein among sentences, preceding the first sentence in the article 502, that are included in the first set of sentences 524 and/or the summary list, the second sentence is closest to the first sentence in the article 502.

The fifth condition may not be met if the first sentence comprises a referring term referring to a first entity without defining the first entity, the first sentence does not define the first entity, and a second sentence that precedes the first sentence in the article 502 and that does not define the first entity, is included in the first set of sentences 524 and/or the summary list, wherein among sentences, preceding the first sentence in the article 502, that are included in the first set of sentences 524 and/or the summary list, the second sentence is closest to the first sentence in the article 502.

In an example, the article 502 may comprise the following sentences: a) James Adams was declared the winner of the election. b) Although John Diggle won the popular vote in most states, he lost the electoral vote. c) He gave a speech to a crowd of supporters following the results being finalized. For example, the sentences (a)-(c) may be contiguous sentences (e.g., sentence (b) may directly follow sentence (a) and/or sentence (c) may directly follow sentence (b)).

One or more sentences may be analyzed to determine whether or not sentence (c) satisfies the fifth condition. Sentence (c) comprises a referring term (e.g., pronoun <He>) referring to a first entity (e.g., John Diggle) without defining the first entity. Whether or not sentence (c) defines the first entity may be determined by analyzing sentence (c) using one or more coreference resolution techniques and/or by determining whether or not sentence (c) comprises a term defining the first entity. It may be determined that sentence (c) does not define the first entity (based upon a determination that sentence (c) does not comprise a term defining the first entity, for example).

In a first example, sentence (b) may be included in the first set of sentences 524 and/or the summary list. Accordingly, among sentences, preceding sentence (c) in the article 502, that are included in the first set of sentences 524, sentence (b) is closest to sentence (c) in the article 502. For example, sentence (b) is determined to be closest to sentence (c) in the article 502 (among sentences, preceding sentence (c) in the article 502, that are included in the first set of sentences 524) based upon a determination that no other sentence, that precedes sentence (c) in the article 502 and that is selected for inclusion in the first set of sentences 524, is closer to sentence (c) than sentence (b). A closeness of sentence (b) to sentence (c) may be a measure of an amount of sentences between sentence (b) and sentence (c) (which is zero due to sentence (b) directly preceding sentence (c) in the article 502). Whether or not sentence (b) defines the first entity may be determined by analyzing sentence (b) and/or sentence (c) using one or more coreference resolution techniques and/or by determining whether or not sentence (b) comprises a term defining the first entity. It may be determined that sentence (b) defines the first entity (e.g., sentence (b) comprises a term <John Diggle> corresponding to the first entity). Accordingly, in the first example, it may be determined that sentence (c) meets the fifth condition. Sentence (c) may be selected for inclusion in the first set of sentences 524 and/or the summary list responsive to the determination that sentence (c) meets the fifth condition.

In a second example, sentence (a) is included in the first set of sentences 524 and/or the summary list and sentence (b) is not included in the first set of sentences 524 and/or the summary list. Accordingly, among sentences, preceding sentence (c) in the article 502, that are included in the first set of sentences 524, sentence (a) is closest to sentence (c) in the article 502. For example, sentence (a) is determined to be closest to sentence (c) in the article 502 (among sentences, preceding sentence (c) in the article 502, that are included in the first set of sentences 524) based upon a determination that no other sentence, that precedes sentence (c) in the article 502 and that is selected for inclusion in the first set of sentences 524, is closer to sentence (c) than sentence (a). A closeness of sentence (a) to sentence (c) may be a measure of an amount of sentences between sentence (a) and sentence (c) (which is 1 due to sentence (b) being between sentence (a) and sentence (c) in the article 502). Whether or not sentence (a) defines the first entity may be determined by analyzing sentence (a) and/or sentence (c) using one or more coreference resolution techniques and/or by determining whether or not sentence (a) comprises a term defining the first entity. It may be determined that sentence (a) does not define the first entity (e.g., sentence (a) defines a different entity, James Adams). Accordingly, in the second example, it may be determined that sentence (c) does not meet the fifth condition.

In some examples, one or more quotes of a sentence (e.g., one or more portions of the sentence that are within quotation marks of the sentence) may not be considered when determining whether or not the sentence meets the fifth condition.

In some examples, the set of conditions may comprise a sixth condition that is met by a first sentence if 1) the first sentence does not comprise a referring term that refers to an entity and that does not define the entity; 2) the first sentence comprises a referring term that refers to an entity and that does not define the first entity, and the first sentence defines the entity; and/or 3) the first sentence comprises a referring term that refers to a first entity and that does not define the first entity, and the first set of sentences 524 and/or the summary list comprise a second sentence (preceding the first sentence in the article 502) that defines the first entity, wherein the first set of sentences 524 and/or the summary list do not comprise a sentence, between the first sentence and the second sentence in the article 502, that comprises a conflicting term (referring to a second entity different than the first entity, for example).

The sixth condition may be met if the first sentence comprises a referring term referring to a first entity without defining the first entity, and a second sentence that precedes the first sentence in the article 502 and that defines the first entity, is included in the first set of sentences 524 and/or the summary list, wherein the first set of sentences 524 and/or the summary list do not comprise a sentence, between the first sentence and the second sentence in the article 502, that comprises a conflicting term (referring to a second entity different than the first entity, for example).

A sentence between the first sentence and the second sentence in the article 502 may correspond to a sentence of the article 502 that is after the second sentence in the article 502 and before the first sentence in the article 502.

A conflicting term may correspond to a term (e.g., a pronoun, a proper noun, etc.) that can cause misunderstanding of the referring term in the first sentence, such as a term that can be incorrectly perceived as a reference for the referring term in the first sentence (e.g., the conflicting term may cause a reader to mistakenly believe that the referring term refers to a second entity defined by and/or referred to by the conflicting term rather than the first entity).

The sixth condition may not be met if the first sentence comprises a referring term referring to a first entity without defining the first entity, the first sentence does not define the first entity, the first set of sentences 524 and/or the summary list comprise a second sentence that precedes the first sentence in the article 502 and that comprises a conflicting term, and the first set of sentences 524 and/or the summary list do not comprise a sentence, between the second sentence and the first sentence in the article 502, that defines the first entity.

In an example, the article 502 may comprise the following sentences: a) John Diggle won the popular vote in most states. b) However, he lost the electoral vote. c) He gave a speech to a crowd of supporters following the results being finalized. In the example, the sentences (a)-(b) are included in the first set of sentences 524 and/or the summary list. One or more sentences may be analyzed to determine whether or not sentence (c) satisfies the sixth condition. Sentence (c) comprises a referring term (e.g., pronoun <He>) referring to a first entity (e.g., John Diggle) without defining the first entity. Whether or not sentence (c) defines the first entity may be determined by analyzing the sentence (c) using one or more coreference resolution techniques and/or by determining whether or not sentence (c) comprises a term defining the first entity. Whether or not sentence (a) defines the first entity may be determined by analyzing sentence (a), sentence (b) and/or sentence (c) using one or more coreference resolution techniques and/or by determining whether or not sentence (a) comprises a term defining the first entity. It may be determined that sentence (a) defines the first entity (e.g., sentence (a) comprises a term <John Diggle> corresponding to the first entity). Accordingly, in the example, it may be determined that sentence (c) meets the sixth condition based upon a determination that the first set of sentences 524 and/or the summary list do not comprise a sentence, between sentence (a) and sentence (c) in the article 502, that comprises a conflicting term (referring to a second entity different than the first entity, for example). For example, it may be determined that the sentence (b) (which is between sentence (a) and sentence (c) in the article 502) does not comprise a conflicting term.

In an example, the article 502 may comprise the following sentences: a) John Diggle married Lyla. b) She was overjoyed. c) He was at peace. In the example, the sentences (a)-(b) are included in the first set of sentences 524 and/or the summary list. One or more sentences may be analyzed to determine whether or not sentence (c) satisfies the sixth condition. Sentence (c) comprises a referring term (e.g., pronoun <He>) referring to a first entity (e.g., John Diggle) without defining the first entity. Whether or not sentence (c) defines the first entity may be determined by analyzing sentence (c) using one or more coreference resolution techniques and/or by determining whether or not sentence (c) comprises a term defining the first entity. Whether or not sentence (a) defines the first entity may be determined by analyzing sentence (a), sentence (b) and/or sentence (c) using one or more coreference resolution techniques and/or by determining whether or not sentence (a) comprises a term defining the first entity. It may be determined that sentence (a) defines the first entity (e.g., sentence (a) comprises a term <John Diggle> corresponding to the first entity). It may be determined that sentence (b) (which is between sentence (a) and sentence (c) in the article 502) does not comprise a conflicting term. For example, although sentence (b) includes a term (e.g., pronoun <She>) referring to a second entity (e.g., Lyla), the term may be determined to not be a conflicting term because the term may not cause misunderstanding of the referring term in the first sentence (such as due to the term corresponding to a different gender than a gender of the referring term in sentence (c), which may remove ambiguity).

In an example, the article 502 may comprise the following sentences: a) John Diggle won the popular vote in most states. b) However, he lost the electoral vote. c) Franklin Jackson expressed anger at the outcome of the election. d) However, Diggle stated that he is happy that he participated in the election. e) He gave a speech to a crowd of supporters following the results being finalized. In the example, sentences (a)-(c) are included in the first set of sentences 524 and/or the summary list and sentence (d) is not included in the first set of sentences 524 and/or the summary list. One or more sentences may be analyzed to determine whether or not sentence (e) satisfies the sixth condition. Sentence (e) comprises a referring term (e.g., pronoun <He>) referring to a first entity (e.g., John Diggle) without defining the first entity. Whether or not sentence (e) defines the first entity may be determined by analyzing sentence (e) using one or more coreference resolution techniques and/or by determining whether or not sentence (e) comprises a term defining the first entity. It may be determined that sentence (c) comprises a conflicting term corresponding to a second entity (e.g., Franklin Jackson). Accordingly, in the example, it may be determined that sentence (e) does not meet the sixth condition based upon a determination that the first set of sentences 524 and/or the summary list comprise the sentence (c), and that the first set of sentences 524 and/or the summary list do not comprise a sentence (e.g., sentence (d)), between sentence (c) and sentence (e) in the article 502, that defines the first entity. For example, if the sentence (e) were to be included in the first set of sentences 524 and/or the summary list (without also including sentence (d) in the first set of sentences 524 and/or the summary list, for example), a reader may incorrectly believe that the referring term (e.g., pronoun <He>) in sentence (e) refers to the second entity (e.g., Franklin Jackson) rather than the first entity (e.g., John Diggle).

In some examples, one or more quotes of a sentence (e.g., one or more portions of the sentence that are within quotation marks of the sentence) may not be considered when determining whether or not the sentence meets the sixth condition.

In some examples, the set of conditions may comprise a seventh condition that is met by a first sentence if 1) the first sentence does not comprise a quotation mark; and/or 2) the first sentence comprises quotation marks that enclose a quote, wherein the quote is fully within the first sentence. The seventh condition may be met if the first sentence does not comprise a quotation mark (e.g., any quotation mark). The seventh condition may be met if the first sentence comprises quotation marks that enclose a quote, wherein the quote is fully within the first sentence. The seventh condition may be met if the first sentence does not comprise at least a portion of a multi-sentence quote. The seventh condition may not be met if the first sentence comprises at least a portion of a multi-sentence quote. The seventh condition may not be met if the first sentence comprises an open quote (e.g., a quote that begins in the first sentence but does not end in the first sentence and/or a quote that ends in the first sentence but does not begin in the first sentence). An open quote may be identified based upon a determination that the first sentence comprises a single quotation mark and/or an odd number of quotation marks (which may be an indication that merely a portion of a quote is included in the first sentence). The seventh condition may not be met if the first sentence comprises a starting quotation mark, which indicates a beginning of a quote, and does not comprise an ending quotation mark that indicates an end of the quote. The seventh condition may not be met if the first sentence comprises an ending quotation mark, which indicates an end of a quote, and does not comprise a starting quotation mark that indicates a beginning of the quote.

In some examples, it may be determined that the sentence 540 (e.g., <In a message to contributors to his campaign and to his supporters, he said "We've lost the election, but we, the people of the United States, must remain proud for what we've done.">) meets the seventh condition. For example, the determination that the sentence 540 meets the seventh condition may be based upon a determination that the sentence 540 comprises a quote that is fully within the sentence 540 and/or that the sentence 540 does not comprise a multi-sentence quote. For example, the determination that a quote of the sentence 540 is fully within the sentence 540 may be based upon identification of a starting quotation mark (preceding a term <We've>) and an ending quotation mark (following a period).

In some examples, it may be determined that a sentence (e.g., <John Diggle said that "the time has come for our tax system to change.">) does not meet the seventh condition. For example, the determination that the sentence does not meet the seventh condition may be based upon a determination that the sentence comprises a quote that is an open quote. The quote may be determined to be an open quote based upon a determination that the first sentence comprises a single quotation mark and/or based upon a determination that the first sentence comprises a starting quotation mark but does not comprise an ending quotation mark.

In some examples, it may be determined that a sentence (e.g., <John Diggle said that "the time has come for our tax system to change. We need to start now.">) does not meet the seventh condition. For example, the determination that the sentence does not meet the seventh condition may be based upon a determination that the sentence comprises a quote that is a multi-sentence quote. The quote may be determined to be a multi-sentence quote based upon a determination that the first sentence comprises a period between a starting quotation mark and an ending quotation mark.

In some examples, a starting quotation mark in a sentence may be identified based upon a determination that the starting quotation mark is preceded (e.g., directly preceded) by a space and/or followed by a letter. In some examples, an ending quotation mark in a sentence may be identified based upon a determination that the ending quotation mark is followed by a space, a comma, a semicolon, a period, etc. and/or that the ending quotation mark is preceded by a letter (and/or a period, an exclamation mark, etc.).

In some examples, the set of conditions may comprise an eighth condition that is met by a first sentence if a size of the first sentence is smaller than a first threshold size. The size of the first sentence may correspond to a number of characters of the first sentence and/or a number of words of the first sentence. In an example, the first threshold size may correspond to 250 characters (or a different number of characters) and/or 50 words (or a different number of words). The eighth condition may not be met if the size of the first sentence is greater than the first threshold size.

In some examples, the set of conditions may comprise a ninth condition that is met by a first sentence if a size of the first sentence is greater than a second threshold size. The size of the first sentence may correspond to a number of characters of the first sentence and/or a number of words of the first sentence. In an example, the second threshold size may correspond to 30 characters (or a different number of characters) and/or 5 words (or a different number of words). The ninth condition may not be met if the size of the first sentence is smaller than the second threshold size.

At 410, a summary list summarizing the article 502 may be generated based upon the first set of sentences 524. In some examples, the summary list comprises a set of list items (e.g., a set of one or more list items), wherein a list item of the set of list items corresponds to a sentence of the first set of sentences 524. For example, a list item of the set of list items may comprise a list symbol and/or a corresponding sentence. The list symbol may precede the corresponding sentence (e.g., a beginning of the corresponding sentence may follow the list symbol). For example, the list symbol may mark the beginning of the list item and/or may introduce the corresponding sentence. In an example, the list symbol may comprise at least one of a bullet symbol (e.g., a bullet character such as Unicode U+2022, a triangular bullet character such as Unicode U+2023 and/or other type of bullet symbol), a hyphen symbol, a number (such as where the set of list items are numbered and/or where a number of a list item is based upon an ordering of the corresponding list item with respect to other list items of the summary list), etc. List items of the summary list may be vertically arranged (e.g., the list items may be arranged above and/or below each other such that a list item of the summary list is vertically coincident with one or more other list items of the summary list and/or such that a list item of the summary list is not horizontally coincident with one or more other list items of the summary list).

Figure 5E:
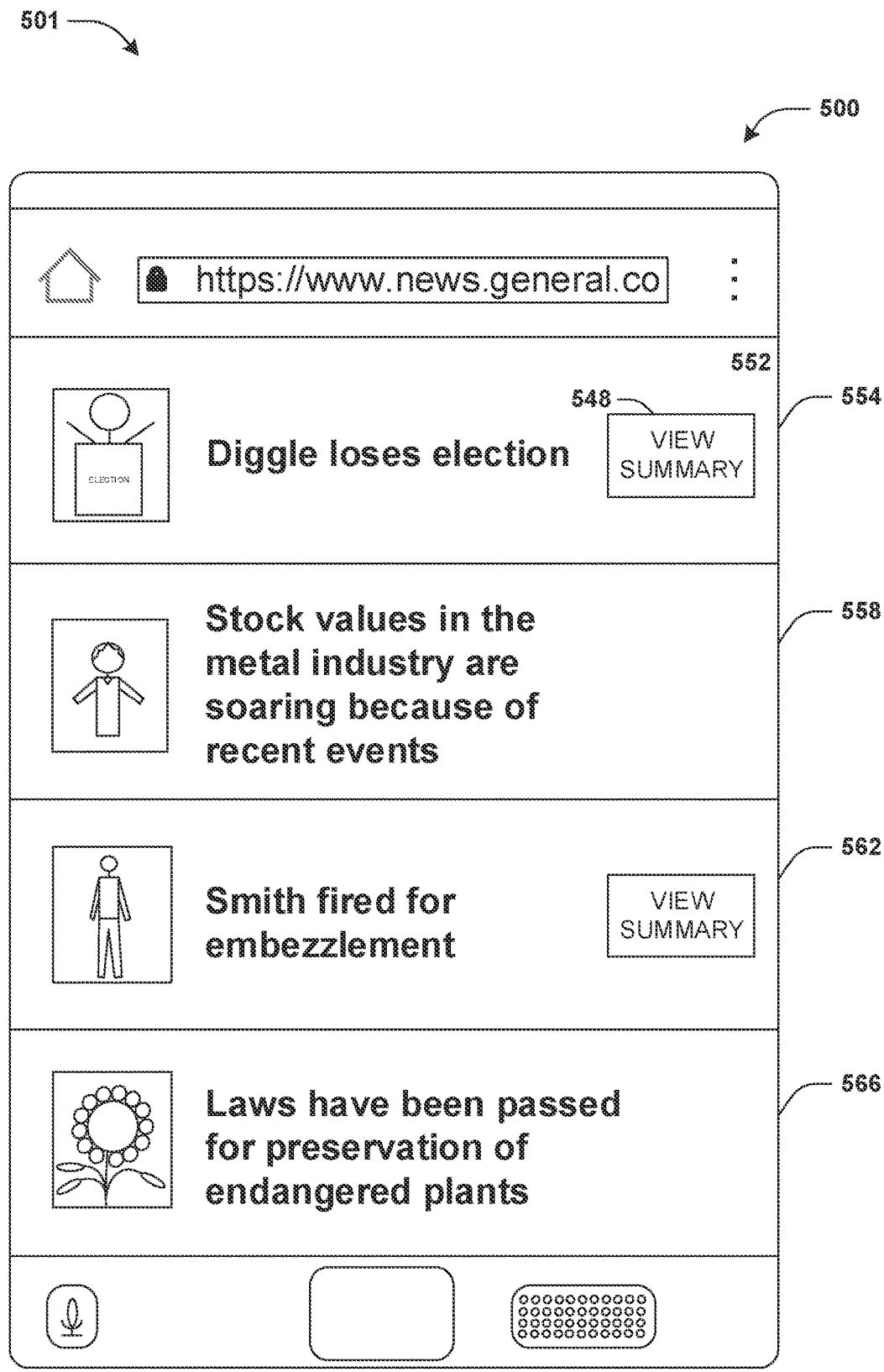
FIG. 5E is a component block diagram illustrating an example system for generating summary lists based upon articles, where a first client device displays a content list.

FIG. 5E illustrates an exemplary scenario in which a first client device 500 (e.g., a phone, a laptop, a computer, a wearable device, a smart device, a television, any other type of computing device, hardware and/or software) displays a content list. The content list may be displayed via a web page 552. The content list may comprise a set of selectable list items associated with a set of content items comprising the article 502. For example, the set of selectable list items may comprise a first selectable list item 554 associated with the article 502 and/or other selectable list items 558, 562 and/or 566 associated with other content items.

In some examples, the content list may comprise one or more summary objects associated with one or more content items of the set of content items. For example, summary objects may be displayed for corresponding content items that are determined to be summarizable and/or for which summary lists are generated (using one or more of the techniques provided herein). One or more summary objects may comprise a first summary object 548 associated with the article 502. For example, the first summary object 548 may be displayed within and/or overlaying the first selectable list item 554. In some examples, the first summary object 548 may be a graphical object (such as comprising an image, a symbol and/or text) which indicates that the summary list associated with the article 502 is available. Alternatively and/or additionally, the first summary object 548 may be a selectable input corresponding to displaying the summary list associated with the article 502.

Figure 5F:
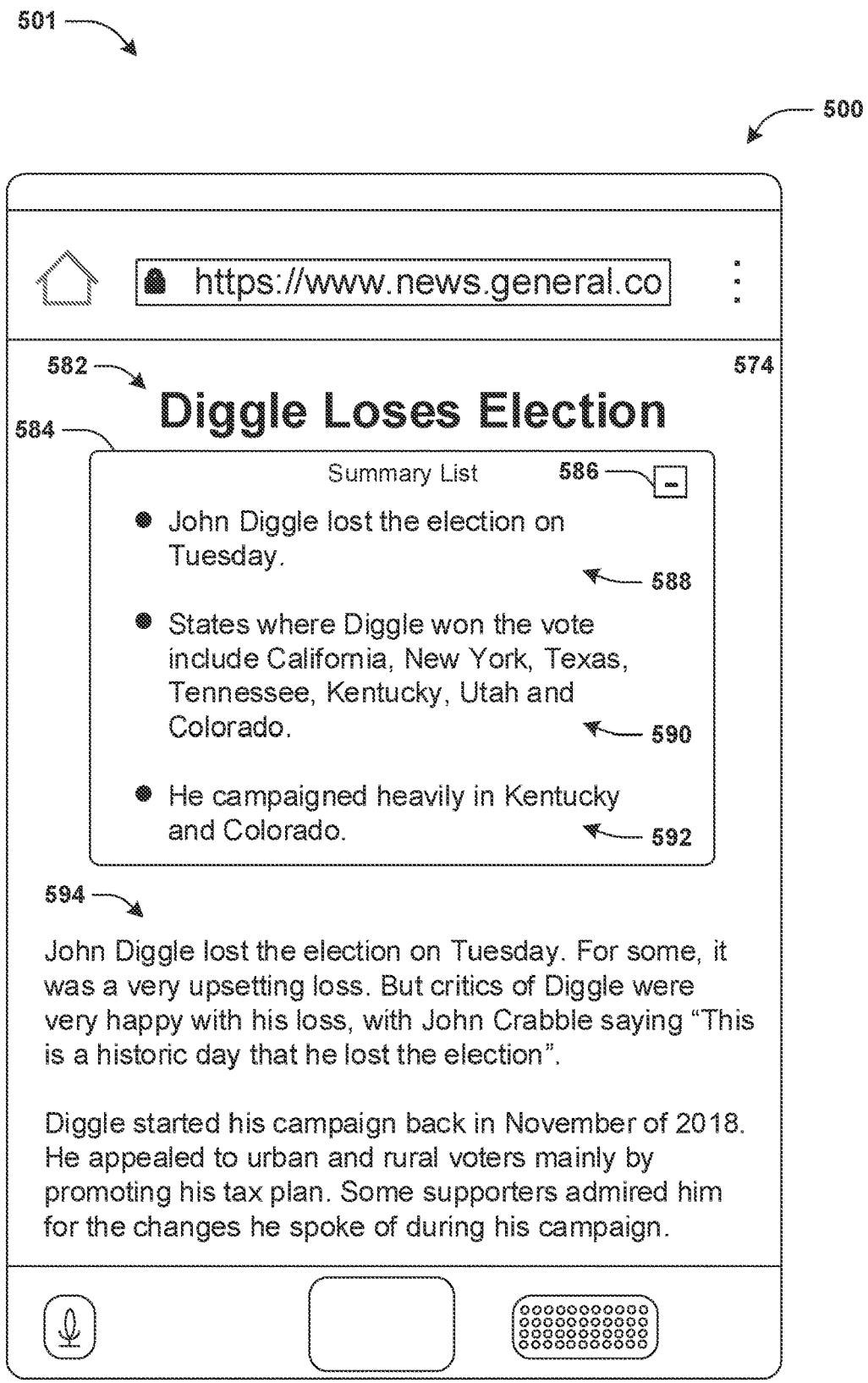
FIG. 5F is a component block diagram illustrating an example system for generating summary lists based upon articles, where a web page comprising a summary list and/or an article is accessed and/or presented via a first client device.

In some examples, a request to present the article 502 may be received from the first client device 500. For example, the request may be received responsive to a selection of the first selectable list item 554 associated with the article 502 and/or a selection of the first summary object 548. Responsive to receiving the request to present the article 502, the summary list and/or the article 502 may be displayed. For example, a web page 574 comprising the summary list (shown with reference number 584 in FIG. 5F) and/or the article 502 may be accessed and/or presented via the first client device 500, such as shown in FIG. 5F.

In some examples, the summary list 584 is displayed above at least some of the article 502. For example, the summary list 584 may be displayed above an article body 594 of the article 502 and/or below a title 582 of the article 502. Alternatively and/or additionally, the summary list 584 may be displayed above the title 582 and/or at a different location with respect to the article 502.

In some examples, the summary list 584 comprises a first list item 588 corresponding to the sentence 530 of the article 502, a second list item 590 corresponding to the sentence 536 and/or a third list item 592 corresponding to the sentence 538. In the example shown in FIG. 5F, list items of the summary list 584 may each comprise a bullet symbol, followed by a corresponding sentence. In some examples, list items of the summary list 584 are arranged in an order in which corresponding sentences occur in the article 502. For example, the first list item 588 may be displayed above the second list item 590 based upon the sentence 530 preceding the sentence 536 in the article 502.

Figure 5G:
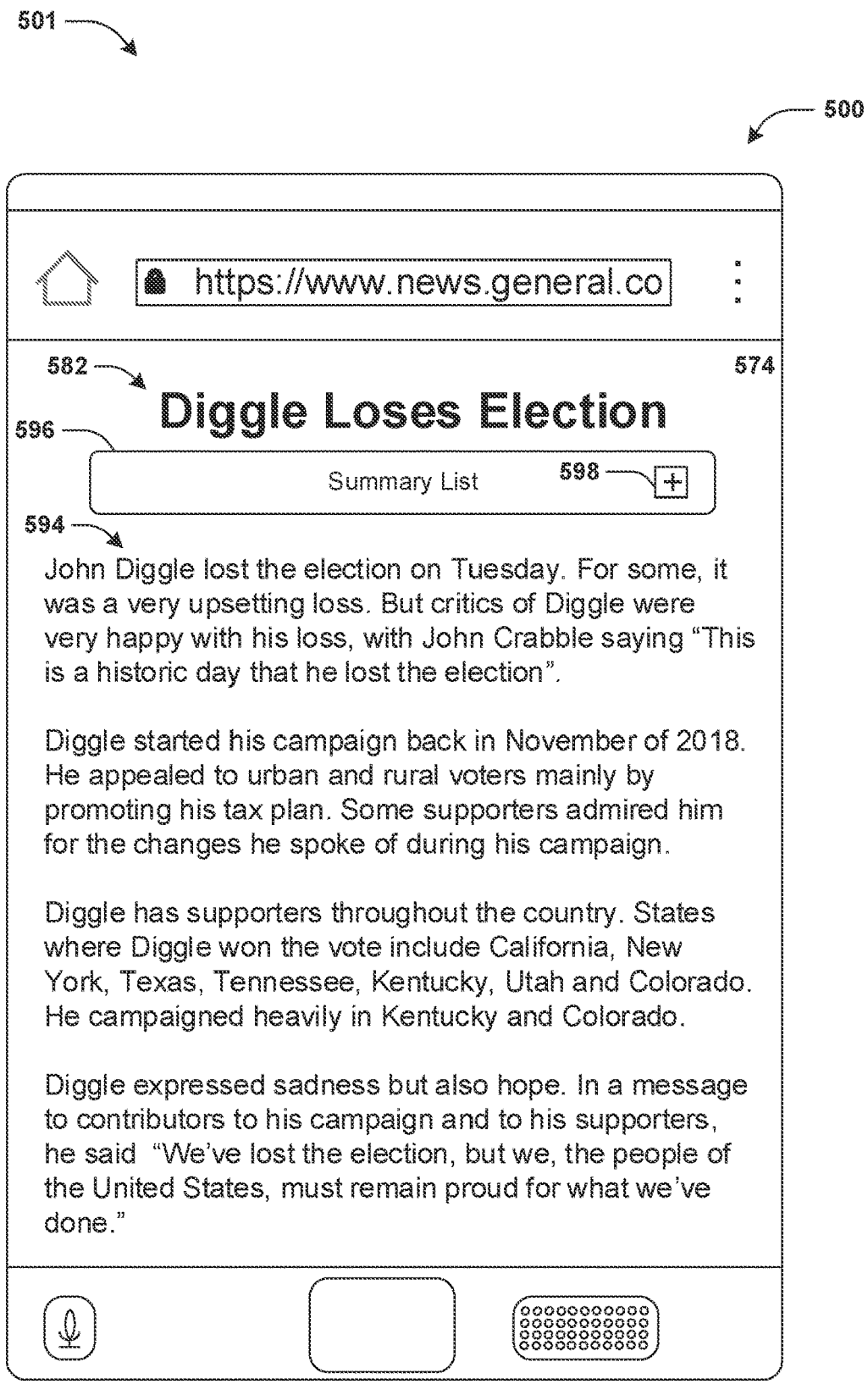
FIG. 5G is a component block diagram illustrating an example system for generating summary lists based upon articles, where a web page comprising a collapsed summary list and/or an article is accessed and/or presented via a first client device.

In some examples, the summary list 584 is expandable and/or collapsible. For example, the summary list 584 may comprise a collapse button 586 (such as when the summary list 584 is in expanded form, such as shown in FIG. 5F). Responsive to a selection of the collapse button 586, the summary list 584 may stop being displayed via the web page 574 and/or a collapsed summary list 596 may be displayed via the web page 574 (such as shown in FIG. 5G). For example, the summary list 584 may collapse responsive to the selection of the collapse button 586. In some examples, the collapsed summary list 596 may comprise an expand button 598. Responsive to a selection of the expand button 598, the collapsed summary list 596 may stop being displayed via the web page 574 and/or the summary list 584 (in expanded form) may be displayed via the web page 574 (such as shown in FIG. 5F). For example, the collapsed summary list 596 may expand responsive to the selection of the expand button 598.

In some examples, responsive to a selection of the first selectable list item 554 (shown in FIG. 5E), the collapsed summary list 596 and/or the article 502 may be displayed (such as shown in FIG. 5G). Alternatively and/or additionally, responsive to a selection of the first selectable list item 554, the summary list 584 (in expanded form) and/or the article 502 may be displayed (such as shown in FIG. 5F). In some examples, responsive to a selection of the first summary object 548 (shown in FIG. 5E), the summary list 584 (in expanded form) and/or the article 502 may be displayed (such as shown in FIG. 5F).

In some examples (such as shown in FIG. 5F), each list item of the summary list 584 associated with the article 502 may comprise an unchanged version of a corresponding sentence of the first set of sentences 524. For example, as shown in FIG. 5F, the first list item 588 may comprise an unchanged version of the sentence 530, the second list item 590 may comprise an unchanged version of the sentence 536 and/or the third list item 592 may comprise an unchanged version of the sentence 538.

In some embodiments, a list item of the summary list 584 may be a modified version of a sentence of the article 502 (such as a sentence of the first set of sentences 524 that meet the set of conditions and/or a sentence of the second set of sentences 526 that do not meet the set of conditions).

In some examples, whether or not one or more sentences of the article 502 can be modified to generate the summary list 584 may be determined based upon the one or more settings (e.g., the one or more settings may be indicative of whether or not modification of sentences of the article 502 to generate the summary list 584 is enabled). Alternatively and/or additionally, whether or not one or more sentences of the article 502 can be modified to generate the summary list 584 may be determined based upon modification eligibility information associated with the article 502. For example, the modification eligibility information may correspond to at least one of one or more copyrights associated with the article 502, one or more permissions and/or one or more policies that may allow and/or may not allow modification of sentences of the article 502 to generate the summary list 584, etc.

In some examples, a first mode for generating the summary list 584 may correspond to a mode in which modification of one or more sentences of the article 502 to generate the summary list 584 is not enabled (e.g., if the summary list 584 is generated in the first mode, one or more sentences of the article 502 may not be modified to generate the summary list 584 and/or each list item of the summary list 584 may comprise an unchanged version of a corresponding sentence of the first set of sentences 524). The first mode for generating the summary list 584 may be activated (and/or the summary list 584 may be generated in the first mode) based upon a determination that the one or more settings indicate that modification of sentences of the article 502 to generate the summary list 584 is not enabled and/or based upon a determination that the modification eligibility information indicates that modification of sentences of the article 502 is not allowed.

In some examples, a second mode for generating the summary list 584 may correspond to a mode in which modification of one or more sentences of the article 502 to generate the summary list 584 is enabled (e.g., one or more sentences of the article 502 may be modified to generate the summary list 584 if the summary list 584 is generated in the second mode). The second mode for generating the summary list 584 may be activated (and/or the summary list 584 may be generated in the second mode) based upon a determination that the one or more settings indicate that modification of sentences of the article 502 to generate the summary list 584 is enabled and/or based upon a determination that the modification eligibility information indicates that modification of sentences of the article 502 is allowed.

In an example in which the summary list 584 is generated in the second mode (e.g., modification of one or more sentences of the article 502 to generate the summary list 584 is enabled), one or more first types of modifications, that may be made to one or more sentences of the article 502 to generate the summary list 584, may be determined based upon the one or more settings and/or the modification eligibility information. For example, the one or more settings may be indicative of one or more types of modifications that are enabled to be made to one or more sentences of the article 502 to generate the summary list 584. Alternatively and/or additionally, the modification eligibility information may be indicative of one or more types of modifications that are allowed to be made to one or more sentences of the article 502 to generate the summary list 584. For example, the one or more first types of modifications may correspond to one or more types of modifications enabled by the one or more settings and/or one or more types of modifications indicated as allowed by the modification eligibility information.

In an example in which the summary list 584 is generated in the second mode, one or more modifications may be made to one or more sentences of the first set of sentences 524 that meet the set of conditions. Alternatively and/or additionally, one or more modifications may be made to one or more sentences of the second set of sentences 526 that do not meet the set of conditions. For example, the one or more sentences of the second set of sentences 526 may be modified to generate one or more modified sentences that do meet the set of conditions. The summary list 584 may be generated based upon the one or more modified sentences (e.g., the summary list 584 may comprise one or more list items corresponding to the one or more modified sentences).

In some examples, the one or more first types of modifications may comprise changing a pronoun of a sentence to a proper noun to generate a list item of the summary list 584, such as using one or more reference-rewriting techniques and/or one or more other techniques (e.g., one or more natural language processing techniques and/or one or more coreference resolution techniques). For example, the pronoun may be modified to a proper noun if one or more conditions are met, such as if the sentence begins with the pronoun and/or the sentence does not comprise a proper noun that defines the pronoun (e.g., whether or not the sentence does not comprise a proper noun that defines the pronoun may be determined using one or more NER techniques and/or one or more other techniques, such as one or more natural language processing techniques and/or one or more coreference resolution techniques). The article 502 and/or the sentence may be analyzed to determine the proper noun that defines the pronoun (e.g., the proper noun may be determined using one or more reference-rewriting techniques and/or one or more other techniques, such as one or more natural language processing techniques and/or one or more coreference resolution techniques).

In an example, the sentence 538 (e.g., <He campaigned heavily in Kentucky and Colorado.>) which begins with a pronoun (e.g., <He>) may be modified to generate a modified sentence having a proper noun (e.g., <Diggle>) in place of the pronoun (e.g., the modified sentence may comprise <Diggle campaigned heavily in Kentucky and Colorado.>).

In an example, the sentence 534 (e.g., <He appealed to urban and rural voters mainly by promoting his tax plan.>) which begins with a pronoun (e.g., <He>) may be modified to generate a modified sentence having a proper noun (e.g., <Diggle>) in place of the pronoun (e.g., the modified sentence may comprise <Diggle appealed to urban and rural voters mainly by promoting his tax plan.>). In some examples, responsive to a determination that the modified sentence meets the set of conditions, the summary list 584 may be generated based upon the modified sentence (even though the sentence 534 is included in the second set of conditions 526 that do not meet the set of conditions). For example, the summary list 584 may comprise a list item corresponding to the modified sentence based upon the modified sentence meeting the set of conditions.

In some examples, the one or more first types of modifications may comprise removing a term of a sentence to generate a list item of the summary list 584. For example, the term may be removed (and/or replaced) if one or more conditions are met, such as if the term is associated with the one or more first types of terms and/or if the sentence begins with the term. In an example, the sentence 532 (e.g., <But critics of Diggle were very happy with his loss, with John Crabble saying "This is a historic day that he lost the election".>) which begins with a term of the one or more first types of terms (e.g., <But>) may be modified by removing the term to generate a modified sentence (e.g., the modified sentence may comprise <Critics of Diggle were very happy with his loss, with John Crabble saying "This is a historic day that he lost the election".>). In some examples, responsive to a determination that the modified sentence meets the set of conditions, the summary list 584 may be generated based upon the modified sentence (even though the sentence 532 is included in the second set of conditions 526 that do not meet the set of conditions). For example, the summary list 584 may comprise a list item corresponding to the modified sentence based upon the modified sentence meeting the set of conditions.

In some examples, the one or more first types of modifications may comprise changing a first term of a sentence to a second term to generate a list item of the summary list 584, such as using one or more reference-rewriting techniques and/or one or more other techniques (e.g., one or more natural language processing techniques and/or one or more coreference resolution techniques). For example, the first term and/or the second term may refer to a first entity. The first term, the second term and/or the first entity may be identified and/or determined using one or more coreference resolution techniques. The first term may be changed to the second term using one or more reference-rewriting techniques. In some examples, the second term may be more explicit than the first term (e.g., the first term may comprise <he> and the second term may comprise <Diggle>). Alternatively and/or additionally, the second term may be less explicit (e.g., more terse) than the first term and/or the second term may comprise fewer characters and/or words than the first term (e.g., the first term may comprise <Congressman John Diggle> and/or the second term may comprise <Diggle>). In some examples, the first term may be changed to the second term having fewer characters and/or words if one or more conditions are met, such as if the sentence has a size greater than a threshold, and/or if changing the first term to the second term results in reducing the size of the sentence.

In some examples, the summary list 584 may be generated based upon a minimum number of list items (e.g., 2 list items) and/or a maximum number of list items (e.g., 6 list items). In an example in which the summary list 584 comprises less than the minimum number of list items (and/or one or more sentences selected for inclusion in the summary list 584 comprise less than the minimum number of list items), one or more additional sentences may be selected and/or one or more list items corresponding to the one or more additional sentences may be included in the summary list 584 (such as using one or more of the techniques provided herein) such that a number of list items of the summary list 584 amounts to at least the minimum number of list items. Alternatively and/or additionally, in an example in which the summary list 584 comprises more than the maximum number of list items (and/or sentences selected for inclusion in the summary list 584 comprise more than the maximum number of list items), one or more list items may be removed from the summary list 584 (and/or one or more sentences may be removed from the sentences selected for inclusion in the summary list 584)

such that a number of list items of the summary list 584 amounts to at most the maximum number of list items.

In some examples, the minimum number of list items and/or the maximum number of list items may be determined based upon one or more characteristics of the article 502. For example, the minimum number of list items and/or the maximum number of list items may be determined based upon the size of the article 502. For example, one or more operations (e.g., mathematical operations) may be performed using the size of the article 502 to determine the minimum number of list items and/or the maximum number of list items. Alternatively and/or additionally, the minimum number of list items and/or the maximum number of list items may be determined based upon a set of information (e.g., a set of information stored on a database, a server and/or a computer). The set of information may be accessed and/or used to determine the minimum number of list items and/or the maximum number of list items (such as based upon the size of the article 502). Alternatively and/or additionally, the minimum number of list items and/or the maximum number of list items may be determined based upon one or more topics of the article 502 and/or the set of information).

Alternatively and/or additionally, the minimum number of list items may be a minimum number of list items used for summary lists associated with articles of different sizes and/or different types. Alternatively and/or additionally, the maximum number of list items may be a maximum number of list items used for summary lists associated with articles of different sizes and/or different types.

Alternatively and/or additionally, the minimum number of list items and/or the maximum number of list items may be determined based upon the one or more settings associated with generating the summary list 584 associated with the article 502. In an example, the one or more settings may be indicative of the minimum number of list items and/or the maximum number of list items.

It may be appreciated that the disclosed subject matter may assist a user in understanding main points of the article 502 using the summary list 584. Further, by comparing sentences of the article 502 with the set of conditions, and including sentences in the summary list 584 that meet the set of conditions (by way of filtering out sentences that do not meet the set of conditions and/or by modifying sentences that do not meet the set of conditions to generate modified sentences that do meet the set of conditions), the summary list 584 may have improved readability and understandability, as compared to summaries with sentences that are not filtered and/or modified based upon the set of conditions. For example, applying the set of conditions to select and/or modify sentences of the article 502 for inclusion in the summary list 584 prevents issues such as the summary list 584 including at least some material that cannot be understood without portions of the article 502. In addition, list items of the summary list 584 being arranged as a list (e.g., being vertically arranged and/or comprising list symbols) may improve readability and/or assist the user in more quickly understanding main points of the article 502 (as compared to other summary formats, such as summaries in paragraph format, that may be harder to read and/or follow).

Alternatively and/or additionally, implementation of at least some of the disclosed subject matter may lead to benefits including a reduction in screen space and/or an improved usability of a display of the first client device 500 (e.g., as a result of generating the summary list 584 and/or displaying the summary list 584 such that list items that may represent main points of the article 502 are automatically displayed via the first client device 500, as a result of providing expandable and/or collapsible functionality of the summary list 584 such that the summary list 584 can be expanded and/or collapsed while the article 502 is displayed, etc.).

Alternatively and/or additionally, implementation of at least some of the disclosed subject matter may lead to benefits including increasing an accuracy and/or precision in transmitting requested and/or desired content to the first client device 500 and/or presenting the requested and/or desired content to a user of the first client device 500 (e.g., as a result of enabling the first client device 500 to display the summary list 584 such that the user of the first client device 500 may understand and/or determine a significance of main points of the article 502 without having to consume the article 502).

Alternatively and/or additionally, implementation of at least some of the disclosed subject matter may lead to benefits including less manual effort (e.g., as a result of generating the summary list 584 automatically, wherein manual editing to produce the summary list 584 is not required because sentences of the article 502 are automatically analyzed based upon the set of conditions, one or more sentences of the article 502 are automatically selected for inclusion in the summary list 584, and/or one or more sentences of the article 502 are automatically modified to generate one or more modified sentences for inclusion in the summary list 584).

In some examples, at least some of the disclosed subject matter may be implemented on a device (e.g., a client device), and in some examples, at least some of the disclosed subject matter may be implemented on a server (e.g., hosting a service accessible via a network, such as the Internet).

Figure 6:
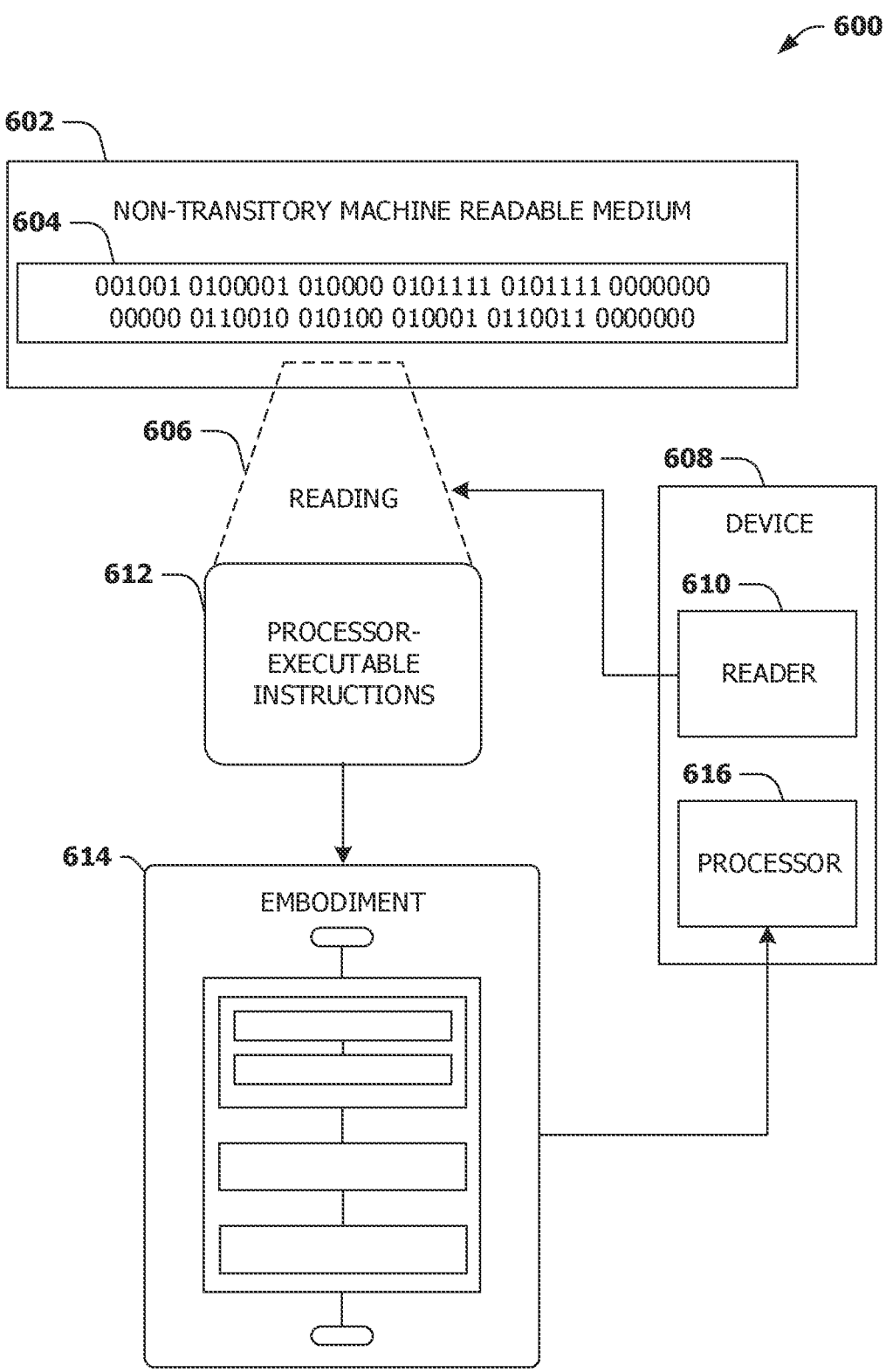
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5G, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    responsive to an article at least one of being uploaded to a content item database, being published via one or more content interfaces or being associated with an amount of activity that exceeds a threshold via at least one of one or more web pages, one or more applications or one or more content interfaces, analyzing the article to identify a plurality of phrases, wherein each phrase of the plurality of phrases comprises at least a portion of a sentence of the article;
    determining a plurality of phrase relevance scores associated with the plurality of phrases;
    selecting, based upon the plurality of phrase relevance scores associated with the plurality of phrases, a set of sentences of the article;
    receiving, from a client device, one or more settings specifying one or more types of modifications that are enabled to be made to one or more sentences;
    analyzing the set of sentences, comprising:
        identifying one or more first sentences of the set of sentences that meet a set of conditions; and
        identifying one or more second sentences of the set of sentences that do not meet the set of conditions, wherein the identifying the one or more second sentences comprises identifying a first sentence as being among the one or more second sentences that do not meet the set of conditions based upon a determination that understanding of at least some of the first sentence relies upon a second sentence that is not included in the one or more first sentences;
    responsive to determining that the one or more types of modifications to one or more sentences of the article are enabled by the one or more settings received from the client device, automatically modifying, in accordance with the one or more types of modifications that are enabled, the first sentence that does not meet the set of conditions to generate a first modified sentence that is understandable without relying upon the second sentence that is not included in the one or more first sentences; and
    generating, based upon the one or more first sentences and the first modified sentence, a summary list summarizing the article.

2. The method of claim 1, comprising:
    determining a sentence relevance rankings of a plurality of sentences of the article based upon the plurality of phrase relevance scores, wherein the selecting the set of sentences is performed based upon the sentence relevance rankings.

3. The method of claim 2, comprising:
    determining a threshold number of sentences, wherein a number of sentences of the set of sentences is at most the threshold number of sentences.

4. The method of claim 2, wherein:
the method comprises determining, based upon the plurality of phrases and the plurality of phrase relevance scores, a plurality of sentence relevance scores associated with the plurality of sentences;
the determining the plurality of sentence relevance scores comprises determining a relevance score associated with a sentence of the plurality of sentences based upon one or more phrase relevance scores of one or more phrases in the sentence; and
the determining the sentence relevance rankings is performed by ranking the plurality of sentences based upon the plurality of phrase relevance scores.

5. The method of claim 1, wherein:
the analyzing the set of sentences comprises determining that a sentence of the one or more second sentences does not meet the set of conditions based upon a determination that:
the sentence begins with a pronoun; and
the one or more first sentences do not comprise a third sentence that precedes the sentence in the article.

6. The method of claim 1, wherein:
the analyzing the set of sentences comprises determining that a sentence of the one or more second sentences does not meet the set of conditions based upon a determination that:
the sentence comprises a pronoun and does not comprise a proper noun; and
the one or more first sentences do not comprise a third sentence that precedes the sentence in the article.

7. The method of claim 1, wherein at least one of:
the analyzing the article to identify the plurality of phrases is performed using at least one of one or more natural language processing techniques, one or more named entity recognition (NER) techniques, one or more dictionary-based phrase detection techniques or one or more coreference resolution techniques;
the determining the plurality of phrase relevance scores is performed using at least one of one or more multi-label learning (MLL) techniques, one or more natural language processing techniques or one or more coreference resolution techniques; or
the analyzing the set of sentences is performed using at least one of one or more natural language processing techniques, one or more NER techniques or one or more coreference resolution techniques.

8. The method of claim 1, wherein:
the analyzing the set of sentences comprises determining that a sentence of the one or more second sentences does not meet the set of conditions based upon a determination that a size of the sentence exceeds a threshold size.

9. The method of claim 1, wherein:
the analyzing the set of sentences comprises determining that a sentence of the one or more second sentences does not meet the set of conditions based upon a determination that:
the sentence comprises a referring term that refers to a first entity and that does not define the first entity;
the sentence does not define the first entity; and
the one or more first sentences comprise a third sentence that precedes the sentence in the article and that does not define the first entity, wherein among sentences, preceding the sentence in the article, that are included in the one or more first sentences, the third sentence is closest to the sentence in the article.

10. The method of claim 1, wherein:
the analyzing the set of sentences comprises determining that a sentence of the one or more second sentences does not meet the set of conditions based upon a determination that:
the sentence comprises a first referring term that refers to a first entity and that does not define the first entity;
the sentence does not define the first entity;
the one or more first sentences comprise a third sentence that precedes the sentence in the article and that comprises a conflicting term; and
the one or more first sentences do not comprise a sentence, between the third sentence and the sentence in the article, that defines the first entity.

11. The method of claim 1, comprising:
receiving a request to present the article; and
controlling a graphical user interface to present the summary list and the article.

12. The method of claim 11, wherein:
the controlling the graphical user interface to present the summary list and the article comprises displaying the summary list above at least some of the article.

13. The method of claim 12, comprising:
displaying a collapse button associated with collapsing the summary list;
receiving a selection of the collapse button; and
responsive to receiving the selection of the collapse button, displaying a collapsed summary list.

14. The method of claim 13, comprising:
displaying an expand button associated with expanding the summary list;
receiving a selection of the expand button; and
responsive to receiving the selection of the expand button, displaying the summary list.

15. The method of claim 1, wherein:
the one or more types of modifications that are enabled comprise changing a first term of a sentence to a second term.

16. The method of claim 1, wherein:
the one or more types of modifications that are enabled comprise removing a term of a sentence.

17. A computing device comprising:
a processor; and
memory comprising processor-executable instructions that when executed by the processor cause performance of operations, the operations comprising:
responsive to an article at least one of being uploaded to a content item database, being published via one or more content interfaces or being associated with an amount of activity that exceeds a threshold via at least one of one or more web pages, one or more applications or one or more content interfaces, analyzing the article and identifying a summarizing set of sentences of the article;
analyzing the summarizing set of sentences, comprising:
identifying one or more first sentences of the summarizing set of sentences that meet a set of conditions; and
identifying one or more second sentences of the summarizing set of sentences that do not meet the set of conditions, wherein the identifying the one or more second sentences comprises identifying a first sentence as being among the one or more second sentences that do not meet the set of conditions based upon a determination that understanding of at least some of the first sentence relies upon a second sentence that is not included in the one or more first sentences;

accessing modification eligibility information corresponding to one or more policies associated with using the article to generate a summary list; and responsive to determining that modification of sentences of the article to generate the summary list is allowed by the modification eligibility information corresponding to the one or more policies associated with the article while one or more second policies associated with one or more other articles do not allow for modification of sentences of the one or more other articles to generate one or more summary lists, automatically modifying, using the processor, the first sentence that does not meet the set of conditions to generate a first modified sentence that is understandable without relying upon the second sentence that is not included in the one or more first sentences; and generating, based upon the one or more first sentences and the first modified sentence, the summary list summarizing the article.

18. The computing device of claim 17, wherein:

the analyzing the summarizing set of sentences comprises determining that a sentence of the one or more second sentences does not meet the set of conditions based upon a determination that:

the sentence comprises a pronoun and does not comprise a proper noun; and the one or more first sentences do not comprise a third sentence that precedes the sentence in the article.

19. The computing device of claim 17, wherein:

the analyzing the summarizing set of sentences is performed using at least one of one or more natural language processing techniques, one or more named entity recognition (NER) techniques or one or more coreference resolution techniques.

20. A non-transitory machine readable medium having stored thereon processor-executable instructions that when executed cause performance of operations, the operations comprising:

responsive to an article at least one of being uploaded to a content item database, being published via one or more content interfaces or being associated with an amount of activity that exceeds a threshold via at least one of one or more web pages, one or more applications or one or more content interfaces, analyzing the article to identify a plurality of phrases, wherein each phrase of the plurality of phrases comprises at least a portion of a sentence of the article;

determining a plurality of phrase relevance scores associated with the plurality of phrases;

selecting, based upon the plurality of phrase relevance scores associated with the plurality of phrases, a set of sentences of the article;

at least one of (i) receiving, from a client device, one or more settings specifying one or more types of modifications that are enabled to be made to one or more sentences or (ii) accessing modification eligibility information corresponding to one or more policies associated with using the article to generate a summary list;

analyzing the set of sentences, comprising:

identifying one or more first sentences of the set of sentences that meet a set of conditions; and identifying one or more second sentences of the set of sentences that do not meet the set of conditions, wherein the identifying the one or more second sentences comprises identifying a first sentence as being among the one or more second sentences that do not meet the set of conditions based upon a determination that understanding of at least some of the first sentence relies upon a second sentence that is not included in the one or more first sentences;

responsive to determining that modification of sentences of the article to generate a summary list is at least one of (i) enabled by the one or more settings received from the client device and specifying the one or more types of modifications that are enabled to be made to one or more sentences or (ii) allowed by the modification eligibility information corresponding to the one or more policies associated with the article while one or more second policies associated with one or more other articles do not allow for modification of sentences of the one or more other articles to generate one or more summary lists, automatically modifying the first sentence that does not meet the set of conditions to generate a first modified sentence that is understandable without relying upon the second sentence that is not included in the one or more first sentences; and generating, based upon the one or more first sentences and the first modified sentence, the summary list summarizing the article.

* * * * *